US012717881B2

(12) United States Patent
Weston-Lewis et al.

(10) Patent No.: US 12,717,881 B2
(45) Date of Patent: Aug. 25, 2026

(54) SYSTEM AND METHOD FOR WEBSITE DEPLOYMENT BASED ON PAGE STRAND AND SUB-STRAND

(71) Applicant: INFOSYS LIMITED, Bangalore (IN)

(72) Inventors: Sebastian Weston-Lewis, London (GB); Himanshu Gupta, Panchkula (IN)

(73) Assignee: Infosys Limited, Bangalore (IN)

( * ) Notice: Subject to any disclaimer, the term of this patent is extended or adjusted under 35 U.S.C. 154(b) by 17 days.

(21) Appl. No.: 18/622,904

(22) Filed: Mar. 30, 2024

(65) Prior Publication Data

US 2025/0307355 A1 Oct. 2, 2025

(51) Int. Cl.

*G06F 16/20* (2019.01)
*G06F 18/2415* (2023.01)
*G06F 16/28* (2019.01)

(52) U.S. Cl.

CPC ........ *G06F 18/2415* (2023.01); *G06F 16/285* (2019.01)

(58) Field of Classification Search

CPC ........................... G06F 16/285; G06F 18/2415
USPC ......................... 707/737, 748, 731, 758, 770
See application file for complete search history.

(56) References Cited

U.S. PATENT DOCUMENTS 8,019,699 B2 * 9/2011 Baxter .................. G06F 18/253 706/12
8,498,950 B2 * 7/2013 Yankov .................. G06N 20/00 706/12
10,474,934 B1 * 11/2019 Cosic ................... G06V 30/194
10,546,237 B2 * 1/2020 Heifets .................... G06N 3/08
11,017,261 B1 * 5/2021 Zheng .................... G06V 10/25
11,531,930 B2 * 12/2022 Guelman .............. G06F 16/285
11,561,987 B1 * 1/2023 Sager .................... G06F 16/248
12,061,612 B1 * 8/2024 Sager ................ G06F 16/24573

(Continued)

FOREIGN PATENT DOCUMENTS

WO WO2006034544 A1 * 4/2006
WO WO2021091597 * 5/2021
WO WO20210191597 A1 * 5/2021

OTHER PUBLICATIONS

Extended Examination Report issued by the European Patent Office for European Application No. 24167963.8, dated Oct. 14, 2024, 10 pages.

*Primary Examiner* — Daniel A Kuddus

(74) *Attorney, Agent, or Firm* — Finnegan, Henderson, Farabow, Garrett & Dunner, LLP

(57) ABSTRACT

This disclosure relates to a page management method and system thereof. The method includes categorizing, using a first ML model, a set of pages into at least one of a plurality of strands, based on a set of first parameters. Further, the method includes classifying each of the set of pages, using a second ML model, into one of a plurality of sub-strands, based on an associated set of second parameters and the associated strand from the plurality of strands. Further, the method includes determining, for each of the set of pages, a score, based on the associated sub-strand, the weight assigned to each of the subset of second parameters of the associated sub-strand, and values of each of the subset of second parameters of the associated sub-strand. Further, the method includes performing an action on at least one of the set of pages based on the determined score.

15 Claims, 11 Drawing Sheets

(56) References Cited

U.S. PATENT DOCUMENTS

| | | | | |
|---|---|---|---|---|
| 2008/0177726 | A1* | 7/2008 | Forbes | G06Q 30/02<br>707/999.005 |
| 2008/0281764 | A1* | 11/2008 | Baxter | G06F 18/214<br>706/12 |
| 2011/0082824 | A1* | 4/2011 | Allison | G06Q 10/10<br>706/46 |
| 2012/0095943 | A1* | 4/2012 | Yankov | G06N 20/00<br>706/12 |
| 2015/0039746 | A1* | 2/2015 | Mukherjee | H04L 41/5067<br>709/224 |
| 2020/0302223 | A1* | 9/2020 | Dutta | G06F 18/24 |
| 2022/0147760 | A1* | 5/2022 | Dutta | G16B 30/20 |
| 2022/0245109 | A1* | 8/2022 | Hatami-Hanza | G06N 7/01 |
| 2022/0292297 | A1* | 9/2022 | Dutta | G06F 18/214 |

* cited by examiner

Categorize, using a first Machine Learning (ML) model, a set of pages into at least one of a plurality of strands, based on a set of first parameters associated with each of the set of pages 302

Classify each of the set of pages, using a second ML model, into one of a plurality of sub-strands, based on an associated set of second parameters and the associated strand from the plurality of strands 304

Determine for each of the set of pages, a score, based on the associated sub-strand, the weight assigned to each of the subset of second parameters of the associated sub-strand, and values of each of the subset of second parameters of the associated sub-strand 306

Perform an action on at least one of the set of pages based on the determined score 308

FIG. 3

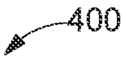

Determine, by the second ML model, the number of plurality of sub-strands to be created based on values of the set of second parameters associated with each of the set of pages 402

Create, by the second ML model, the plurality of sub-strands 404

FIG. 4

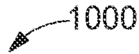

Identify a second trigger event associated with a page from the set of pages 1002

Reclassify the page into a sub-strand from the plurality of sub-strands in response to the second trigger event 1004

Recompute a score for the page, based on the associated sub-strand, weight assigned to each of the subset of second parameters of the associated sub-strand, and values of each of the subset of second parameters of the associated sub-strand 1006

Determine, by the second ML model, a unique set of attributes for each of the plurality of sub-strands 1102

Identify introduction of a new page, the new page is absent in the set of pages 1104

Determine the set of first parameters and the set of second parameters associated with the new page 1106

Categorize, by the first ML model, the new page into at least one of the plurality of strands, based on the set of first parameters of the new page 1108

Match, by the second ML model, the set of second parameters of the new page with the unique set of attributes determined for each of the plurality of sub-strands 1110

Classify the new page into a sub-strand from the plurality of sub-strands 1112

FIG. 11

SYSTEM AND METHOD FOR WEBSITE DEPLOYMENT BASED ON PAGE STRAND AND SUB-STRAND

TECHNICAL FIELD

This disclosure relates generally to page deployment, and more particularly to page management method and system thereof.

BACKGROUND

In the era of digital transformation, websites have become increasingly complex and dynamic. They often consist of numerous pages, each serving a unique purpose and containing different types of content. Managing these pages efficiently is a significant challenge, especially for large-scale websites. Traditionally, web pages have been categorized either at a generic level (e.g., product list page, product detail page, landing page) or individually. This approach poses challenges in aggregating page types at a more granular, pattern-based level. Moreover, such categorization is typically retrospective, restricting the ability to do real-time computations.

Therefore, there is a need for techniques that may manage and categorize web pages in real-time, at a granular level, and adapt to changes in web page content and structure using machine learning (ML) models.

SUMMARY

In one embodiment, a method of page management is disclosed. In one example, the method may include categorizing, using a first Machine Learning (ML) model, a set of pages into at least one of a plurality of strands, based on a set of first parameters associated with each of the set of pages. Further, the method may include classifying each of the set of pages, using a second ML model, into one of a plurality of sub-strands, based on an associated set of second parameters and the associated strand from the plurality of strands. A sub-strand from the plurality of sub-strands may be linked with a subset of the set of second parameters. The classification may include assigning, to each of the subset of second parameters, a corresponding weight that is unique for that sub-strand. Further, the method may include determining, for each of the set of pages, a score, based on the associated sub-strand, the weight assigned to each of the subset of second parameters of the associated sub-strand, and values of each of the subset of second parameters of the associated sub-strand. Further, the method may include performing an action on at least one of the set of pages based on the determined score.

In one embodiment, a system of page management is disclosed. In one example, the system may include a processor and a memory communicatively coupled to the processor. The processor may store processor-executable instructions, which, on execution, may cause the processor to categorize, using a first Machine Learning (ML) model, a set of pages into at least one of a plurality of strands, based on a set of first parameters associated with each of the set of pages. The processor-executable instructions, on execution, may further cause the processor to classify each of the set of pages, using a second ML model, into one of a plurality of sub-strands, based on an associated set of second parameters and the associated strand from the plurality of strands. A sub-strand from the plurality of sub-strands may be linked with a subset of the set of second parameters. The classification may include assigning, to each of the subset of second parameters, a corresponding weight that is unique for that sub-strand. The processor-executable instructions, on execution, may further cause the processor to determine for each of the set of pages, a score, based on the associated sub-strand, the weight assigned to each of the subset of second parameters of the associated sub-strand, and values of each of the subset of second parameters of the associated sub-strand. Further, the processor-executable instructions, on execution, may cause the processor to perform an action on at least one of the set of pages based on the determined score.

It is to be understood that both the foregoing general description and the following detailed description are exemplary and explanatory only and are not restrictive of the invention, as claimed.

BRIEF DESCRIPTION OF THE DRAWINGS

The accompanying drawings, which are incorporated in and constitute a part of this disclosure, illustrate exemplary embodiments and, together with the description, explain the disclosed principles.

FIG. 3 illustrates a flowchart of a process for page management, in accordance with an embodiment of the present disclosure;

FIG. 4 illustrates a flowchart of a process for determining the number of plurality of sub-strands to be created, in accordance with an embodiment of the present disclosure;

FIG. 10 is a flowchart of a process for reclassification of a page from a set of pages based on a second trigger event, in accordance with an embodiment of the present disclosure;

FIG. 11 is a flowchart of a process for classifying a new page into a sub-strand, in accordance with an embodiment of the present disclosure;

DETAILED DESCRIPTION

Figure 1:
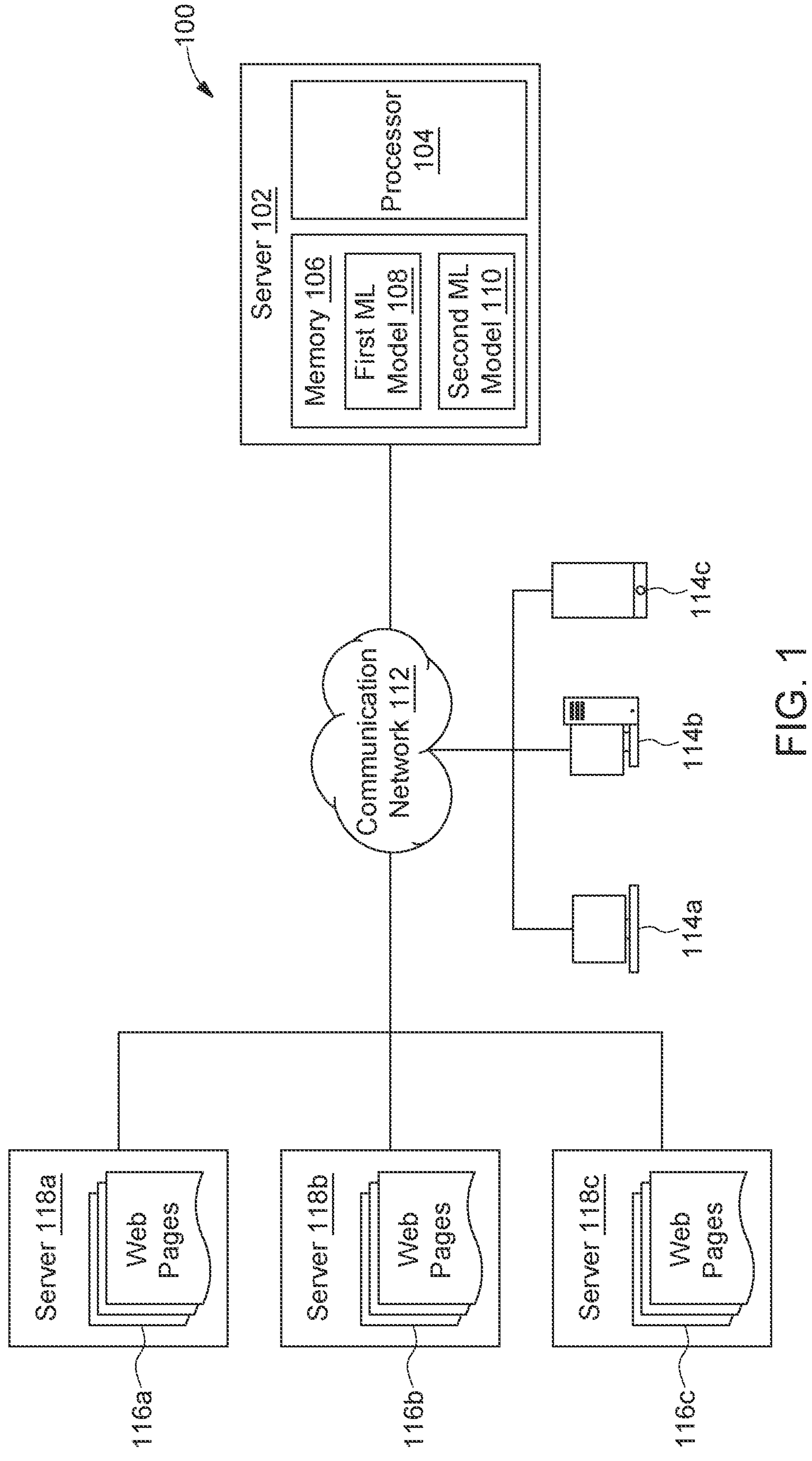
FIG. 1 illustrates a block diagram of a system for page management, in accordance with an embodiment of the present disclosure.

Exemplary embodiments are described with reference to the accompanying drawings. Wherever convenient, the same reference numbers are used throughout the drawings to refer to the same or like parts. While examples and features of disclosed principles are described herein, modifications, adaptations, and other implementations are possible without departing from the spirit and scope of the disclosed embodiments. It is intended that the following detailed description be considered as exemplary only, with the true scope and spirit being indicated by the following claims.

Definitions

The term "machine learning (ML) model" may refer to a computational or statistical or mathematical model that is trained on classical ML modelling techniques with or without classical image processing. The ML model is trained over a dataset using an algorithm that may be used to learn from the dataset. For example, in page management, ML models may be used to analyze and classify pages into different categories or types based on various features and attributes of these pages.

The term "mean shift algorithm" may refer to a non-parametric clustering algorithm used to partition a set of data points into clusters based on their density. It works by iteratively shifting data points towards the mode or centre of their respective clusters until convergence. For example, in page management, the mean shift algorithm may be employed to group similar pages together based on their content, structure, or user interaction patterns, while ensuring sufficient distribution to represent each page effectively and precisely.

The term "strands" may refer to a high-level category or grouping of pages within a website or application. Strands may be created based on common characteristics, functionalities, or purposes of the pages they include. In some embodiments, strands may be created based on combination of one or more of: industry vertical, locale, breakpoint, or page type. Industry vertical, for example, may include, but is not limited to e-commerce, travel, news and media, retail, telecom, or social media. Locale corresponds to a language in which the page is rendered and may include, for example, English, Mandarin, Spanish, French, Russian, Greek, Hindi, Japanese, Portuguese, or Swahili. Breakpoint may correspond to width of a page defined by a device that may render that page. Examples of breakpoint may include, but are not limited to tablet, smartphone, laptop, desktop, or smart TV. Page type, for example, may include, but is not limited to "Product Listings Page," "Product Detail Page," "Checkout Page," etc.

The term "sub-strands" may refer to a secondary level of categorization linked to the first level (strands). For a large number of pages that belong to the same strand, they may be further divided into sub-strands based on consumption data. The consumption data may include how many people access these pages, where they access these pages from, what they do on these pages, the pattern of traffic (is it always busy or busy at certain points in time), and which social media platforms redirect to a given page.

End of Definitions

As described earlier, managing pages of large-scale dynamic websites poses significant challenges. Traditional methods of categorizing pages at a generic level or individually tend to be retrospective and lack the ability to manage the dynamic nature of modern websites. They may not provide sufficient granularity in page type categorization, limiting their effectiveness in managing large-scale websites. The present disclosure addresses these challenges by introducing a two-level categorization process using ML models. A first ML model may categorize web pages into 'strands' and a second ML model may further classify these web pages into 'sub-strands' based on consumption data. This approach incorporates pre-processing steps and reinforcement learning for improved accuracy and efficiency. The use of the second ML model for determining page sub-strands may allow for a more detailed understanding of the pages, which may be crucial for risk analysis and decision-making processes. This may lead to enhanced operational efficiency and adaptability.

FIG. 1 is a block diagram that illustrates a system 100 for page management, in accordance with an exemplary embodiment of the present disclosure. The system 100 may include a server 102 and a plurality of user devices 114 (e.g., a laptop 114*a*, a desktop 114*b*, and a mobile phone 114*c*) associated with a plurality of users. The server 102 may be a centralized server or a group of decentralized servers that may be communicatively coupled with the plurality of user devices 114 via a communication network 112. Examples of the communication network 112 may include, but may not be limited to, a wireless fidelity (Wi-Fi) network, a light fidelity (Li-Fi) network, a local area network (LAN), a wide area network (WAN), a metropolitan area network (MAN), a satellite network, the Internet, a fiber optic network, a coaxial cable network, a radio frequency (RF) network, and a combination thereof.

The server 102 may include a processor 104 and a memory 106. The memory 106 may be a non-volatile memory or a volatile memory. Examples of non-volatile memory may include, but are not limited to, a flash memory, a Read Only Memory (ROM), a Programmable ROM (PROM), Erasable PROM (EPROM), and Electrically EPROM (EEPROM) memory. Examples of volatile memory may include, but may not be limited to, Dynamic Random Access Memory (DRAM), and Static Random-Access Memory (SRAM).

The memory 106 may store processor instructions. The processor instructions, when executed by the processor 104, may cause the processor 104 to implement one or more embodiments of the present disclosure such as, but not limited to, categorizing a set of pages into at least one of a plurality of strands, classifying each of the set of pages into one of a plurality of sub-strands, determining, for each of the set of pages, a score, based on the associated sub-strand, and performing an action on at least one of the set of pages. The memory 106 may include a first ML model 108 that may be used to categorize the set of pages into at least one of the plurality of strands and a second ML model 110 that may be used to classify each of the set of pages into one of the plurality of sub-strands. The memory may also include various modules that enable the server 102 to perform page management. These modules are explained in detail in conjunction with FIG. 2.

In order to manage pages of applications, a set of pages 116 (which may include web pages 116*a*, 116*b*, and 116*c*) of the applications may be accessed by the server 102 via the communication network 112. The set of pages 116 may be hosted on one or more web servers 118 (which may include web servers 118*a*, 118*b*, and 118*c*). For example, web pages 116*a* may be hosted on the web server 118*a*, web pages 116*b* may be hosted on the web server 118*b*, and web pages 116*c* may be hosted on the web server 118*c*. The set of pages 116 may also be accessed by the plurality of user devices 114.

The application may be a website, a web application, a micro-website, a mobile application, or an intranet of any of the following sectors including, but may not be limited to, retail, e-commerce, online advertising, social media, telecommunications, insurance, automotive industry, financial services, travel, transportation, logistics, real estate, public and social sector, sports, energy, mining, healthcare, education, or consumer packaged goods. On similar lines, the set of pages 116 may be webpages that may vary depending on a type of application. For example, in an e-commerce application, the set of pages 116 may include, but are not limited to a homepage, a product details page, a login page, or a checkout page. By way of another example, in a travel-based application the set of pages 116 may include, but are not limited to, a homepage, destination pages, search result pages, booking pages, or review pages.

The set of pages 116 may be processed by the server 102 in order to manage the set of pages 116. The processing may involve two main steps, i.e., categorization of the set of pages 116 into a plurality of strands and then classification of the set of pages 116 into a plurality of sub-strands. While the categorization may be performed by the first ML model 108, the classification may be performed by the second ML model 110. Examples of the first ML model 108 and the second ML model 110 may include but are not limited to logistic regression, Naive Bayes, K Nearest Neighbors, random forest, boosting algorithms, k-means, hierarchical clustering, Convoluted Neural Network (CNN), Recurrent Neural Network (RNN), Multi-Layer Perceptrons (MLP), Long Short Term Memory (LSTM), Generative Adversarial Networks (GANs), Radial Basis Function Networks (RBFNs), Self-Organizing Maps (SOMs), Deep Belief Networks (DBNs), Restricted Boltzmann Machines (RBMs), or Graph Neural Network (GNN).

The plurality of strands may be created based on combination of one or more of industry vertical, locale, breakpoint, or page type. Industry vertical, for example, may include, but is not limited to e-commerce, travel, news and media, retail, telecom, or social media. Locale corresponds to a language in which the page is rendered and may include, for example, English, Mandarin, Spanish, French, Russian, Greek, Hindi, Japanese, Portuguese, or Swahili. Breakpoint may correspond to width of a page defined by a device that may render that page. Examples of breakpoint may include, but are not limited to tablet, smartphone, laptop, desktop, or smart TV. Page type, for example, may include, but is not limited to "Product Listings Page," "Product Detail Page," "Checkout Page."

The first ML model 108 may categorize each of the set of pages 116 based on an associated set of first parameters. The set of first parameters, for example, may be type of content on the page (for example, product lists, product detail information, content-heavy pages), the structure of the URL, or metadata associated with the page. The server 102 may retrieve the set of first parameters for a given page and provide it to the first ML model 108 as input. The first ML model 108 may analyze these set of first parameters to categorize the set of pages 116 into at least one of the plurality of strands. By way of an example, a product list page of an e-commerce website that is in English and is structured to be rendered on a smartphone may be categorized into a strand that has been created for the following combination: e-commerce (industry vertical), product list page (page type), English (locale), smartphone (breakpoint). By way of another example, an inventory/product list page of a real-estate website that is in Spanish and is structured to be rendered on a laptop is categorized into a strand that has been created for the following combination: real-estate (industry vertical), product list page (page type), Spanish (locale), and laptop (breakpoint). It will be apparent that in some implementations a strand may be created based on only one of the following: industry vertical, page type, locale, or breakpoint.

Once the set of pages 116 is categorized into the plurality of strands, the second ML model 110 may classify each of the set of pages 116 into one of a plurality of sub-strands. This classification may be based on a set of second parameters retrieved by the server 102 and a strand from the plurality of strands in which a given page has already been categorized. In other words, classification of a page is based on a combination of second parameters extracted for that page and the strand in which the page has been categorized by the first ML model 108.

The set of second parameters may include but is not limited to sources of traffic to the page (e.g., direct, search, affiliate link, social network), patterns of traffic volume (e.g., traffic time information, traffic geographical information, traffic demographical information, and concentration information), inventory availability, frequency of changes related to availability, conversion rates, or frequency of price changes. It may be noted that the above given examples of these parameters are not exhaustive and may vary depending on the specific applications being considered.

The number of sub-strands to be created may be determined by the second ML model 110 based on values of the set of second parameters retrieved for each of the set of pages 116. To this end, the second ML model 110 may use a mean shift clustering algorithm. In some embodiments, the variance in the values of the set of second parameters may determine the number of sub-strands to be created in order to represent effectively and precisely each of the set of pages 116. This is further explained in detail in conjunction with FIG. 4.

A given sub-strand in the plurality of sub-strands may be linked with a subset of the set of second parameters. In other words, the subset may include a smaller collection of parameters selected from a larger or complete set of second parameters. It may represent a focused group of attributes or characteristics that determine and define the sub-strand. Accordingly, a page from the set of pages 116 is classified into the sub-strand. By way of an example and as an extension of the examples shared above, to create a sub-strand under which inventory listing pages of real-estate websites (categorized under a given strand) may be classified, only a few parameters may be relevant. These parameters may include sources of traffic to the page, patterns of traffic volume, and frequency of changes related to availability. Other remaining parameters may not be relevant for the creation of this sub-strand.

In some embodiments, when creation of a sub-strand and subsequent classification of pages into that sub-strand may be executed, each parameters included in the sub-strand may end up having a weight assigned to them. In other words, the sub-strand may be defined by the weights assigned to each of these parameters. These weights may be derived from the weights already assigned to parameters retrieved for these pages. The assigned weight may indicate significance of each parameter in defining importance of that parameter for a page. By way of an example, for an e-commerce webpage, the parameter 'conversion rates' may have the highest weight of '0.5' while the parameter 'number of views' may have the weight of '0.3' and the parameter 'sources of traffic to the page' may have the weight of '0.2.' By way of another example, for a news webpage, the parameter 'conversion rates' may not be a relevant parameter, while the parameter 'number of views' may have the highest weight of '0.5' and the parameter 'sources of traffic to the page' may have the weight of '0.4'. In other words, a parameter that may have greater impact on distinguishing priority or importance of a page may be assigned higher weights, while a less influential parameter may be assigned a lower weight. This is further explained with detailed examples in conjunction with FIGS. 12A and 12B.

When such second parameters along with the assigned weights are included as relevant parameters with values within a given range of values for a sub-strand, the sub-strand may later be identified by these parameters, a given range of values, and their assigned weights. In other words, each sub-strand may be representative of a unique combination of a range of values of a subset of second parameters along with their associated weights.

Once each of the set of pages 116 has been classified into one of the plurality of sub-strands, the server 102 may further determine a score for each of the set of pages 116. The score determined for a page may be based on the sub-strand in which the page is classified, the weight associated with each of the subset of second parameters of the sub-strand, and values of each of the subset of second parameters. In some embodiments, the score may be representative of a risk associated with the page.

Further, the server 102 may perform an action on at least one of the set of pages 116 based on the determined score. The action that the server 102 may perform on each set of pages 116 may vary depending on the objectives and requirements of the application. The action may include deployment related actions for a given page. The deployment related actions may include but are not limited to branching deployment or feature toggle deployment. In some embodiments, when these actions are not deployment related decisions, the actions may include promoting the page, demoting the page, categorizing the page differently, prioritizing its visibility, or any other relevant action aimed at optimizing user experience.

Figure 2:
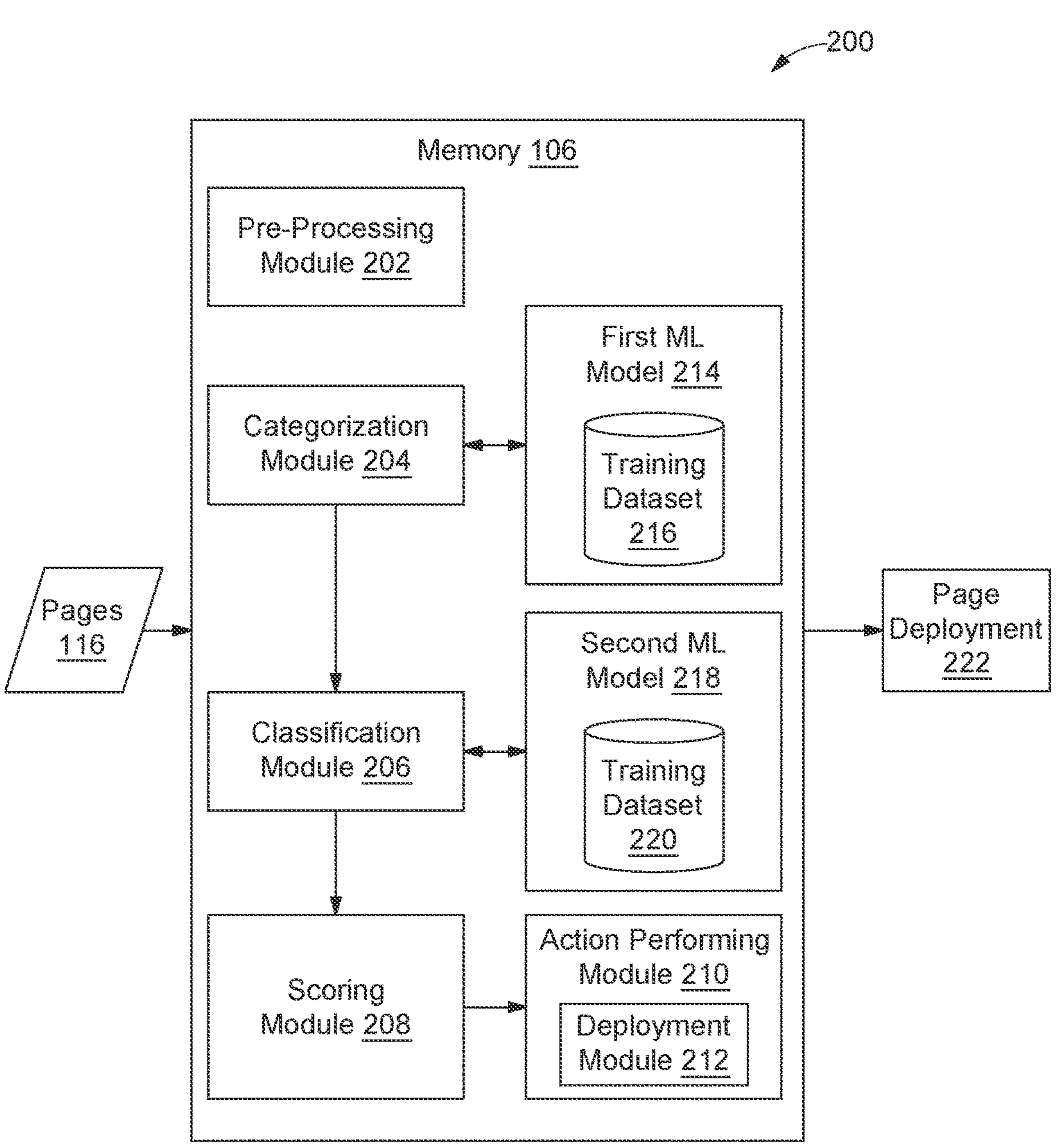
FIG. 2 illustrates a block diagram of various modules within a memory of a server configured to perform page management, in accordance with an embodiment of the present disclosure.

FIG. 2 is a block diagram that illustrates various modules within the memory 106 of the server 102, in accordance with an exemplary embodiment of the present disclosure. FIG. 2 is explained in conjunction with elements from FIG. 1. The memory 106 may include various modules that enable the server 102 to perform page management. These modules may include a categorization module 204, a classification module 206, a scoring module 208, and an action performing module 210.

In order to initiate the page management process, initially, the set of pages 116, (such as web pages) retrieved by the server 102 may be received by the categorization module 204. The categorization module 204 may categorize the set of pages 116 into at least one of a plurality of strands. The categorization may be based on a set of first parameters associated with each of the set of pages 116. The set of first parameters may include page content (e.g., product lists, product detail information, content-heavy pages), metadata at page level, or URL structure. This has already been explained in detail in conjunction with FIG. 1.

The categorization of the set of pages 116 may be done using a first ML model 214. The first ML model 214 may use a training dataset 216 in order to learn categorization of pages into one or more of the plurality of strands. The process of training the first ML model 214 is explained in greater detail in conjunction with FIG. 5. Prior to categorization, a pre-processing module 202 may pre-process the set of pages 116. Pre-processing a page may include but is not limited to removing HTML tags from the page, extracting a set of data vectors from at least one source associated with the page, removing a subset of data vectors that correspond to noisy or irrelevant data, and normalizing the remaining set of data vectors to generate a normalized set of data vectors. It may be noted that data vectors may be mathematical representation of data that has both magnitude and direction. Data vectors may be extracted using models like Doc2Vec, Word2vec, or image vectorizations models. Vector representation may be linear or in the form of an array. By way of an example, vector of extracted data may be represented as: [0.0145779439, 0.00345895264, 0.0567809879]. The pre-processing step is further explained in detail in conjunction with FIG. 8.

Further, the first ML model 214 may process the normalized set of data vectors based on attributes associated with each of the plurality of strands. Attributes associated with a given strand may include, but are not limited to, a unique combination of page type, locale, breakpoint, and industry vertical. Processing may include computing Euclidean distance or Cosine similarity between the normalized set of data vectors and vector representation of attributes of the strand. In response to the processing, the first ML model 214 may further classify the page under the strand in order to categorize the page into that strand.

Once the set of pages 116 is categorized into one or more of the plurality of strands, the classification module 206 may classify each of the set of pages 116 into one of a plurality of sub-strands. The classification may be based on an associated set of second parameters and a strand from the plurality of strands in which a given page has already been categorized. In other words, classification of a page is based on a combination of second parameters extracted for that page and the strand in which the page has been categorized by the first ML model 214. The set of second parameters may include but is not limited to sources of traffic to the page (e.g., direct, search, affiliate link, social network), patterns of traffic volume (e.g., traffic time information, traffic geographical information, traffic demographical information, and concentration information), inventory availability, frequency of changes related to availability, conversion rates, or frequency of price changes. It may be noted that the above given examples of these parameters are not exhaustive and may vary depending on the specific applications or website being considered.

The classification module 206 may use a second ML model 218 to classify pages. The second ML model 218 may use a training dataset 220 in order to learn how to classify each of the set of pages 116 into one of the plurality of sub-strands. A process of training the second ML model 218 is explained in detail in conjunction with FIG. 6. In order to classify the set of pages 116, the second ML model 218 may first determine the number of sub-strands that are to be created based on values of the set of second parameters retrieved for each of the set of pages 116. A given sub-strand in the plurality of sub-strands may be linked with a subset of the set of second parameters. In other words, the subset may include a smaller collection of parameters selected from a larger or complete set of second parameters. It may represent a focused group of attributes or characteristics that determine and define the sub-strand. Accordingly, the classification module 206 classifies a page from the set of pages 116 into the sub-strand. This has already been explained in conjunction with FIG. 1.

After the set of pages 116 is categorized into one of the plurality of strands and subsequently into a sub-strand from the plurality of sub-strands, the scoring module 208 may determine a score for each of the set of pages 116. The score may be determined for a page based on the sub-strand in which the page has been classified, the weight assigned to each of the subset of second parameters in the sub-strand, and values of each of the subset of second parameters in the sub-strand. The score may be representative of a risk associated with the page. In some embodiments, the score may also be used to categorize the page into a specific risk profile category.

Based on the determined score, the action performing module 210 may perform an action on at least one of the set of pages 116. The action performing module 210 may analyze the score and may decide on appropriate actions to take for each page. The action performing module 210 may include a deployment module 212 that may determine deployment decisions for page deployment 222, based on the score determined for that page. The deployment decisions may range from deploying the page without any modifications to postponing deployment or adjusting the page to mitigate potential risks.

In an embodiment, if a page receives a low risk score, the deployment module 212 may proceed with deploying the page as usual. However, if a page poses a higher risk based on its score, the deployment module 212 may choose to delay deployment of the page, conduct further testing for the page either manually or through a testing program, or implement other risk mitigation measures on the page. The deployment decisions have been explained in conjunction with an exemplary embodiment given in FIG. 13. Apart from deployment related actions, the action performing module 210 may perform other actions that may include promoting the page, demoting it, categorizing it differently, prioritizing its visibility, or any other relevant action aimed at optimizing a user experience.

It should be noted that all such aforementioned modules 204-212 may be represented as a single module or a combination of different modules. Further, as will be appreciated by those skilled in the art, each of the engines 204-212 may reside, in whole or in parts, on one device or multiple devices in communication with each other. In some embodiments, each of the modules 204-212 may be implemented as dedicated hardware circuit comprising custom application-specific integrated circuit (ASIC) or gate arrays, off-the-shelf semiconductors such as logic chips, transistors, or other discrete components. Each of the modules 204-212 may also be implemented in a programmable hardware device such as a field programmable gate array (FPGA), programmable array logic, programmable logic device, and so forth. Alternatively, each of the modules 204-212 may be implemented in software for execution by various types of processors (e.g., the processor 104). An identified module of executable code may, for instance, include one or more physical or logical blocks of computer instructions, which may, for instance, be organized as an object, procedure, function, or other construct. Nevertheless, the executables of an identified module or component need not be physically located together but may include disparate instructions stored in different locations which, when joined logically together, include the module and achieve the stated purpose of the module. Indeed, a module of executable code could be a single instruction, or many instructions, and may even be distributed over several different code segments, among different applications, and across several memory devices.

As will be appreciated by one skilled in the art, a variety of processes may be employed for page management. For example, the exemplary server 102 may provide page management by the processes discussed herein. In particular, as will be appreciated by those of ordinary skill in the art, control logic and/or automated routines for performing the techniques and steps described herein may be implemented by the server 102 either by hardware, software, or combinations of hardware and software. For example, suitable code may be accessed and executed by the one or more processors on the server 102 to perform some or all of the techniques described herein. Similarly, application specific integrated circuits (ASICs) configured to perform some, or all of the processes described herein may be included in the processor on the server 102.

FIG. 3 illustrates a flowchart of a process 300 for page management, in accordance with an exemplary embodiment of the present disclosure. FIG. 3 is explained in conjunction with elements from FIG. 1 and FIG. 2. In an embodiment, the process 300 may be implemented by the server 102.

At step 302, a set of pages may be categorized into one or more of a plurality of strands using a first ML model. The plurality of strands may be created based on combination of one or more of: industry vertical, locale, breakpoint, or page type. The categorization may be based on a set of first parameters associated with each of the set of pages. The set of first parameters may include page content (e.g., product lists, product detail information, content-heavy pages), metadata at page level, or URL structure. This has been explained in detail in conjunction with FIG. 1.

At step 304, each of the set of pages may be classified into one of a plurality of sub-strands using a second ML model based on a set of second parameters. The classification of a page may be based on a subset of the set of second parameters associated with the page and the strand from the plurality of strands in which the page was categorized. The set of second parameters may include traffic sources (e.g., direct, search, affiliate link, social network), traffic volume patterns (e.g., traffic time information, traffic geographical information, traffic demographical information, and concentration information), inventory availability, frequency of changes related to availability, frequency of price changes, and conversion rates.

The number of sub-strands to be created may also be determined by the second ML model 110 based on values of the set of second parameters retrieved for each of the set of pages. To this end, the second ML model 110 may use a mean shift clustering algorithm. In some embodiments, the variance in the values of the set of second parameters may determine the number of sub-strands to be created in order to accurately represent each of the set of pages 116. This is further explained in detail in conjunction with FIG. 4.

As discussed before, a sub-strand from the plurality of sub-strands may be linked with a subset of the set of second parameters. The subset of the set of second parameters may refer to specific parameters that may be particularly relevant or may accurately represent a given sub-strand within a larger category, i.e., a strand. To further elaborate, each sub-strand represents a more granular classification within a broader category of pages, i.e., a strand. For example, within the broader category of “Product Listing Pages” (PLP) for an e-commerce website in English, there may be various sub-strands such as PLP Type X1, PLP Type X2, etc., each representing different characteristics or patterns observed in the set of pages. Now, for each of these sub-strands, there may be a unique set of parameters that are most relevant for accurately classifying and representing pages in that specific sub-strand. These parameters may include factors like traffic sources, traffic volume patterns, inventory availability, and frequency of changes.

As discussed in FIG. 1 and FIG. 2, apart from the unique set of parameters, values of parameters extracted for a page are also important to determine a sub-strand into which the page would be classified. Thus, in order to classify the page into the sub-strand, compliance of the value of each of the subset of second parameters extracted for that page may be compared with a corresponding predefined threshold range defined for each of the subset of second parameters in relation to the sub-strand. These predefined threshold ranges may be specific to each sub-strand and may help to determine whether the values of the parameters for a given page fall within acceptable range for classification into a given sub-strand.

For instance, consider a sub-strand denoted as "PLP Type X1" within a strand (or category) of "PLP in e-commerce vertical." This sub-strand may have predefined threshold ranges for parameters such as traffic volume, conversion rate, and geographical distribution of traffic. During classification of a given page into the sub-strand "PLP Type X1," the values of the subset of second parameters (i.e., traffic sources, traffic volume, and traffic distribution patterns) associated with that page may be compared to the corresponding predefined threshold ranges defined for "PLP Type X1." Only if the values fall within the defined ranges, the page may be classified into "PLP Type X1."

In addition to the subset of parameters and range of values for each of these subset of parameters, once pages are classified into that sub-strand, each parameters included in the sub-strand may end up having a weight assigned to them. These weights may be derived based on weights already assigned to parameters retrieved for these pages. The assigned weight may indicate an importance or significance of each parameter in defining the importance of that parameter for a page. This is further explained with detailed examples in conjunction with FIGS. 12A and 12B.

After classification of the set of pages into the plurality of sub-strands, a score may be determined for each of the set of pages at step 306. For a given page, the score may be determined based on the sub-strand in which it is classified, the weight assigned to each of the subset of second parameters associated with the sub-strand, and values of each of the subset of second parameters associated with the sub-strand.

Furthermore, at step 308, an action may be performed on at least one of the set of pages based on the determined score. In some embodiments, the action performed on a page may include applying a deployment decision on the page based on the score determined for the page. The score may be representative of a risk associated with the page. In some embodiments, based on the score of the page, it may be classified under one of multiple risk profile categories or types, for example, risk type A, risk type B, risk type C, or risk type D. Depending on the risk type, specific deployment processes (for example, deployment process A, deployment process B, deployment process C) may be selected for the page.

FIG. 4 illustrates a flowchart of a process 400 for determining the number of plurality of sub-strands to be created, in accordance with an exemplary embodiment of the present disclosure. In an embodiment, the process 400 may be implemented by the server 102. At step 402, a second ML model may determine the number of plurality of sub-strands to be created based on values of the set of second parameters associated with each of the set of pages. The second ML model 110 may use a mean shift clustering algorithm. In some embodiments, the variance in the values of the set of second parameters may determine the number of sub-strands to be created in order to accurately represent each of the set of pages. The second ML model may then create the plurality of sub-strands based on the determined number, at step 404.

By way of an example, there may be 100 web pages that need to be classified into sub-strands after categorization into strands. One of the parameters for each of these web pages may be the number of views, which may vary between 1000 to 10000 for these 100 web pages. In this case, 10 sub-strands may be created, such that, values of the number of views for the first sub-strand may range from 1 to 999, while values of the number of views for the 10th sub-strand may range from 9000 to 10000. Thereafter, each of the 10 sub-strands may include 10 webpages from the 100 webpages. It will be apparent that the number of strands to be created may depend on values of multiple parameters. A single parameter and equal classification into the sub-strands have been considered for ease of explanation.

Figure 5:
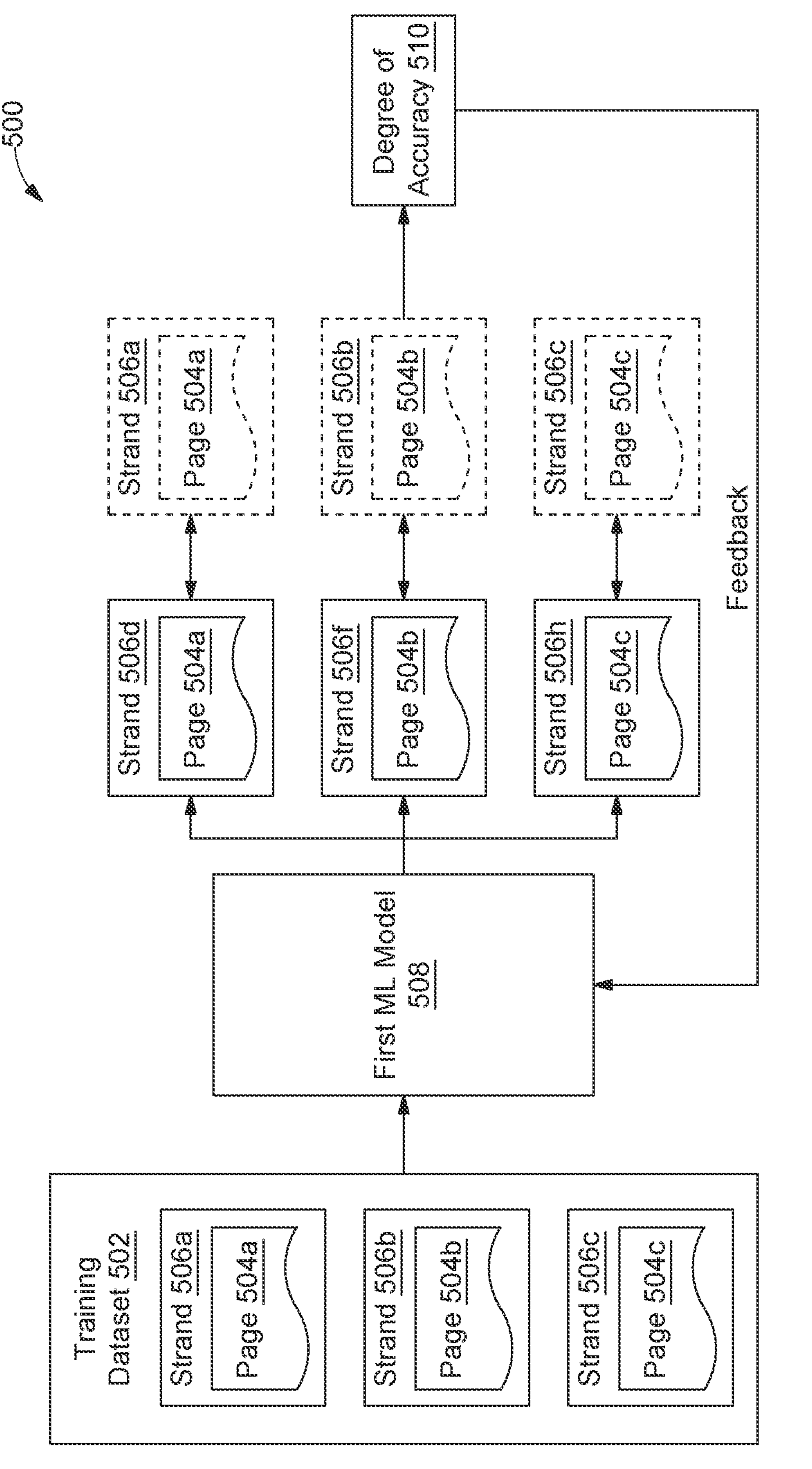
FIG. 5 is a flow diagram depicting training of a first ML model to categorize pages into a plurality of strands, in accordance with an embodiment of the present disclosure.

FIG. 5 is a flow diagram 500 depicting training of a first ML model 508 to categorize pages into a plurality of strands, in accordance with an exemplary embodiment of the present disclosure. FIG. 5 is explained in conjunction with elements from FIG. 1-FIG. 4. Initially, a training dataset 502 may be selected. The training dataset 502 may include a plurality of pages 504 that are pre-categorized into a plurality of strands 506 (for example, a page **504*a* pre-categorized into a strand 506*a*, a page 504*b* pre-categorized into a strand 506*b*, and a page 504*c* pre-categorized into a strand 506*c***).

In order to train the first ML model 508, the training dataset 502 may be fed into the first ML model 508, which may then categorize the plurality of pages 504 into one or more of the plurality of strands 506. For example, the page **504*a* may be categorized into a strand 506*d*, the page 504*b* may be categorized into a strand 506*f*, and the page 504*c* may be categorized into a strand 506*h***.

The categorization of the plurality of pages 504 may then be compared with corresponding pre-categorization. For example, for the page **504*b* the categorization into the strand 506*f* may be compared with pre-categorization of the page 504*b* into the strand 506*b*. Based on the comparison, a degree of accuracy 510 of the first ML model 508 may be determined. The degree of accuracy 510 may be fed back to the first ML model 508 in order to perform reinforcement or incremental learning. Additionally, there may be a human in the loop as well, who may help in determining the adjustments that should be made to the first ML model 508, such that, the first ML model 508 is able to accurately categorize the plurality of pages 504. This cycle is repeated till the degree of accuracy 510 of the first ML model 508** is above an acceptable threshold.

Figure 6:
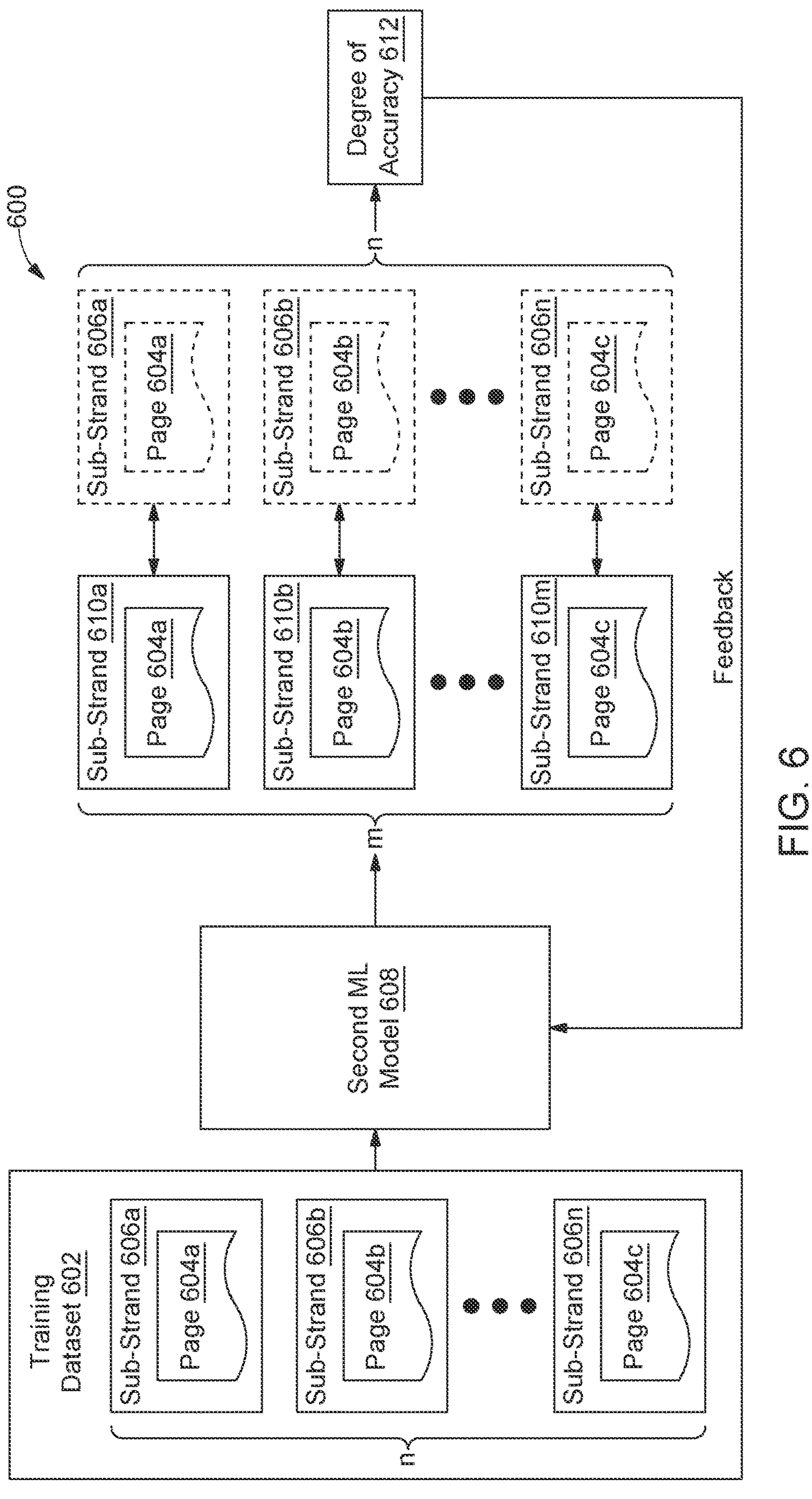
FIG. 6 is a flow diagram depicting training of a second ML model to classify pages into a plurality of sub-strands, in accordance with an embodiment of the present disclosure.

FIG. 6 is a flow diagram 600 depicting training of a second ML model to classify pages into a plurality of sub-strands, in accordance with an exemplary embodiment of the present disclosure. FIG. 6 is explained in conjunction with elements from FIG. 1-FIG. 5. Initially, a training dataset 602 may be selected. The selected training dataset 602 may include pages 604 that are pre-classified into a first predefined number of a first set of sub-strands 606. The first predefined number may be 'n' in the current embodiment. Thus, as depicted in FIG. 6 for example, a page **604*a* may be classified into a sub-strand 606***a*, a page 604*b* may be classified into a sub-strand 606*b*, and a page 604*c* may be classified into a sub-strand 606*n*. The pages 604 in the training dataset 602 are selected such that the degree of variance (which may also be called entropy) in the set of second parameters for the pages 604 may be above a threshold. The threshold may be decided such that each page is effectively and precisely represented with respect to its distinguishing features or characteristics.

The training dataset 602 may be fed into a second ML model 608. Based on values of the set of second parameters associated with each of the pages 604 in the training dataset 602, the second ML model 608 may firstly create a second predefined number of a second set of sub-strands 610. The second predefined number may be 'm' in the current embodiment. Additionally, the second ML model 608 may classify each of the pages 604 into one of the second set of sub-strands 610. For example, the page 604*a* may be classified into the sub-strand 610*a*, the page 604*b* may be classified into the sub-strand 610*b*, and the page 604*c* may be classified into the sub-strand 610*m*.

Thereafter, the second predefined number, i.e., 'm' may be compared with the first predefined number, i.e., 'n.' Additionally, a set of attributes for each of the first set of sub-strands 606 may be compared with attributes of corresponding sub-strands from the second set of sub-strands 610. Based on the comparing, a degree of accuracy 612 of the second ML model 706 may be determined. The determined degree of accuracy 612 may then be provided as feedback into the second ML model 608, which may perform reinforcement or incremental learning. Additionally, there may be a human in the loop as well, who may help in determining the adjustments that should be made to the second ML model 608, such that, the second ML model 608 is able to accurately determine the total number of sub-strands to be created. This cycle is repeated till the degree of accuracy 610 of the second ML model 608 is above an acceptable threshold.

Figure 7:
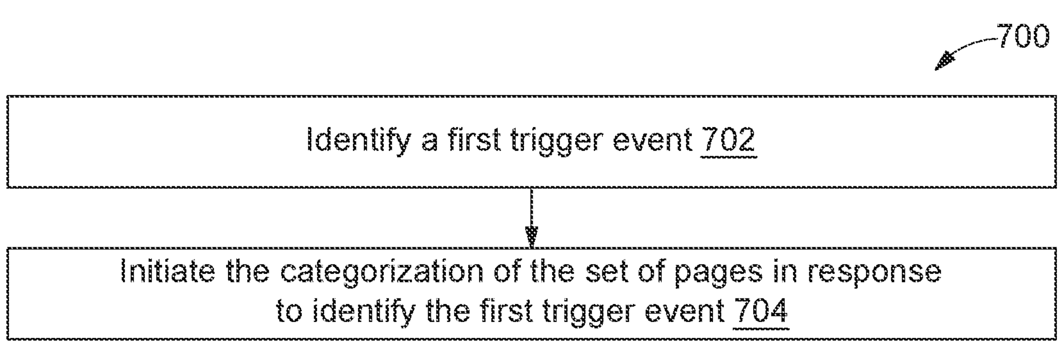
FIG. 7 illustrates a flowchart of a process for initiating categorization of a page based on a first trigger event, in accordance with an embodiment of the present disclosure.

FIG. 7 illustrates a flowchart of a process 700 for initiating categorization of a page based on a first trigger event, in accordance with an exemplary embodiment of the present disclosure. At step 702, a first trigger event may be identified. The first trigger event may refer to a specific condition or action that prompts the server 102 to initiate categorizing of a set of pages. This trigger event may be a predefined condition set within the server 102. The predefined condition may include but is not limited to expiry of a predefined time interval, occurrence of particular events, a specific user action, changes in content or structure of one or more pages, or any other predetermined criterion that may be set by an administrator of the server 102. The server 102 may continuously detect occurrence of the trigger events. In response to identifying the first trigger event, the categorization of the set of pages may be initiated, at step 704.

Figure 8:
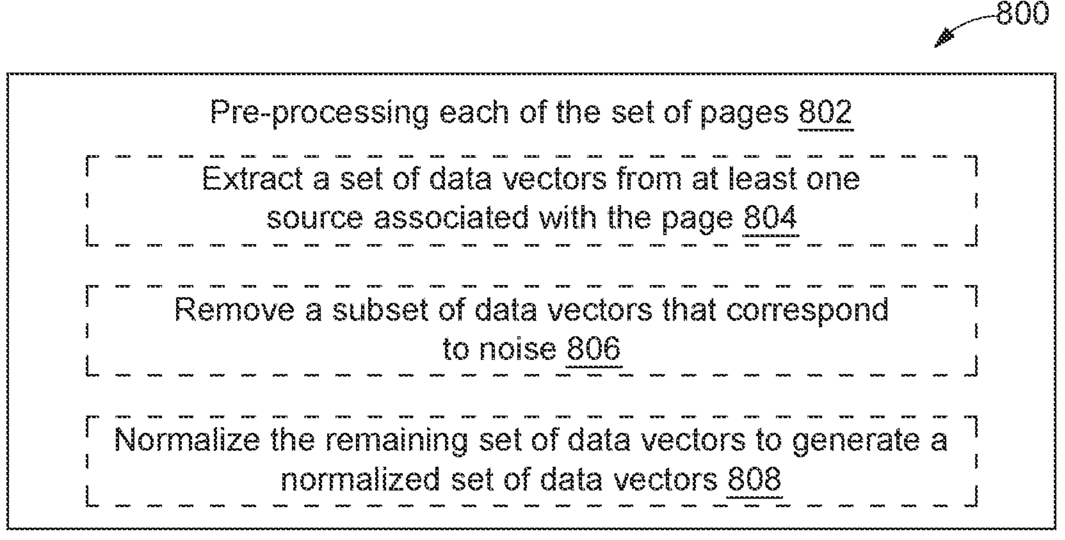
FIG. 8 illustrates a flowchart of a process for pre-processing a set of pages, in accordance with an embodiment of the present disclosure.

FIG. 8 illustrates a flowchart of a process 800 for pre-processing a set of pages, in accordance with an exemplary embodiment of the present disclosure. FIG. 8 is explained in conjunction with elements from FIG. 1-FIG. 3. In an embodiment, the process 800 may be implemented by the server 102.

In order to categorize the set of pages into at least one of a plurality of strands, initially, each of the set of pages may be pre-processed, at step 802. To pre-process a page, a set of data vectors may be extracted from at least one source associated with the page, at step 804. The set of data vectors may include relevant information extracted from the pages, such as text content, metadata, and structural elements (e.g., headers and footers). It may be noted that data vectors may be mathematical representation of data that has both magnitude and direction. Data vectors may be extracted using models like Doc2Vec, Word2vec, or image vectorizations models. Vector representation of data may be linear or in the form of an array based on the ML model that would be processing the data vectors. By way of an example, vector of extracted data may be represented as: [0.0145779439, 0.00345895264, 0.0567809879].

Some of the data vectors that are extracted at step 804 may correspond to noise. In other words, these data vectors are irrelevant or redundant and may not contribute to arrive at a decision on categorization or subsequent classification of the page. Therefore, at step 806, a subset of data vectors, which correspond to noise, may be removed. In some embodiments, one or more ML models may be used for identification and subsequent removal of data vectors that contribute to noise. The identification of data vectors that contribute to noise may become more accurate over time as the ML model being used performs incremental learning to that effect. As a result of noise removal, a more refined or focused set of data vectors may be provided as input to the first ML model 214 and the second ML model 218.

After removal of the data vectors that correspond to noise, the remaining set of data vectors may be normalized to generate a normalized set of data vectors, at step 808. Normalization may include scaling the values of the remaining set of data vectors to a standard range or format. This standardization may ensure that all remaining set of data vectors are on a similar scale, preventing any single feature from dominating the analysis due to its magnitude.

Figure 9:
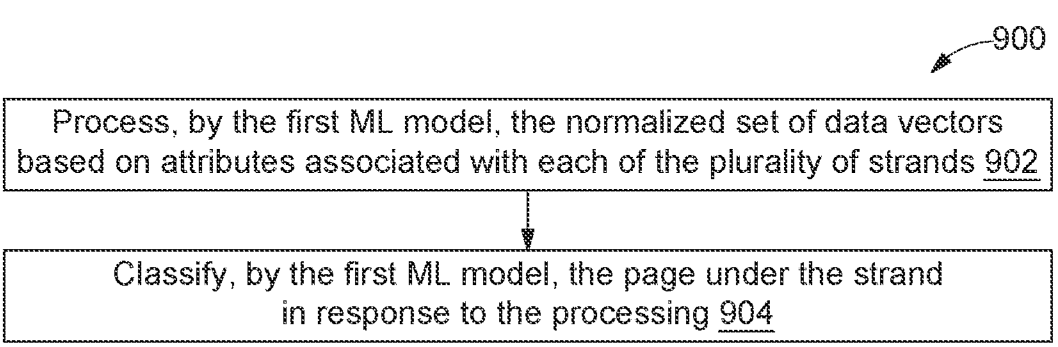
FIG. 9 illustrates a flowchart of a process for categorizing a set of pages into a plurality of strands by processing normalized set of data vectors, in accordance with an embodiment of the present disclosure.

FIG. 9 illustrates a flowchart of a process 900 for categorizing a set of pages into a plurality of strands by processing normalized set of data vectors, in accordance with an exemplary embodiment of the present disclosure. At step 902, the normalized set of data vectors for a page may be processed by a first ML model. The processing may be performed based on attributes associated with each of the plurality of strands. The attributes may include features such as industry vertical, locale, breakpoint, or page type. In some embodiments, the first ML model may compare the normalized set of data vectors for the page with vector representation of features of each of the plurality of strands.

Thereafter, the first ML model may determine the Euclidean distance or cosine similarity of the normalized set of data vectors with respect to vector representation of attributes of each of the plurality of strands. In response to the processing, the page may be classified under a strand from the plurality of strands by the first ML model, at step 904. In some embodiments, the cosine similarity of the normalized set of data vectors with respect to the strand may be the highest (or the Euclidean distance may be the least). Based on this, the decision to classify the page into the strand may be made. The classification may lead to categorization of the page into the strand as discussed in FIG. 1-FIG. 3.

FIG. 10 is a flowchart of a process 1000 for reclassification of a page from the set of pages based on a second trigger event, in accordance with an exemplary embodiment of the present disclosure. In an embodiment, the process 1000 may be implemented by the server 102. At step 1002, a second trigger event associated with the page may be identified. It should be noted that the second trigger event may occur after the initial categorization of the set of pages has taken place and each of the set of pages has already been classified into strands and sub-strands. The second trigger event may be triggered by a change in the value of at least one of the set of second parameters associated with the page. Examples of such changes may include change in content of the page (for example, updates to inventory or product listing, modifications in pricing), fluctuations in traffic sources, increase/decrease in traffic volume, modification in conversion rates, or variations in traffic volume patterns.

In response to the second trigger event and based on the type of change in the value of at least one of the set of second parameters, the page may be reclassified into a sub-strand (that is different from the original sub-strand) from the plurality of sub-strands, at step 1004. The reclassification may ensure that the page is accurately categorized based on its updated attributes or conditions, reflecting any changes in its characteristics.

Thereafter, at step 1006, a score for the page may be recomputed, based on the new sub-strand, weight assigned to each of the subset of second parameters for the new sub-strand, and values of each of the subset of second parameters. Scoring has already been explained in detail in conjunction with FIG. 1-FIG. 3. It may be noted that reclassification of pages may be a continuous process that may be performed based of trigger events to make sure that any given page is promptly and correctly classified into the most relevant sub-strand.

FIG. 11 is a flowchart of a process 1100 for classifying a new page into a sub-strand, in accordance with an exemplary embodiment of the present disclosure. With reference to FIG. 1-FIG. 3, once the plurality of sub-strands has been created and each of a set of pages has been classified into one of the plurality of sub-strands, a second ML model may determine a unique set of attributes for each of the plurality of sub-strands at step 1102. The set of attributes for a given sub-strand may be able to uniquely identify and differentiate the sub-strand from the remaining plurality of sub-strands. Attributes may be a combination of second parameters associated with the sub-strand and range of values of each of the second parameters. By way of an example, one of the attributes that corresponds to the second parameter "number of views" for the sub-strand may be represented as "number of views ranging from 1000 to 10000 views in a given day."

At step 1104, introduction of a new page may be identified. The new page may be absent in the set of pages initially categorized into strands and sub-strands. In other words, the new page has neither been processed by a first ML model to categorize in a strand, nor the new page has been processed by the second ML model to classify into a sub-strand.

At step 1106, a set of first parameters and a set of second parameters associated with the new page may be determined. At step 1108, the first ML model may categorize the new page into at least one of the plurality of strands, based on the set of first parameters of the new page. At step 1110, the second ML model may match the set of second parameters of the new page with the unique set of attributes determined for each of the plurality of sub-strands. The matching may help to identify a sub-strand that the new page is most similar to.

At step 1112, the new page may be classified into the sub-strand. The classification may be determined by selecting the sub-strand whose unique set of attributes most closely match the set of second parameters of the new page. It may be noted that the cosine similarity between the set of second parameters of the new page and the unique set of attributes of the sub-strand may be the highest (or the Euclidean distance may be the lowest).

Figure 12A:
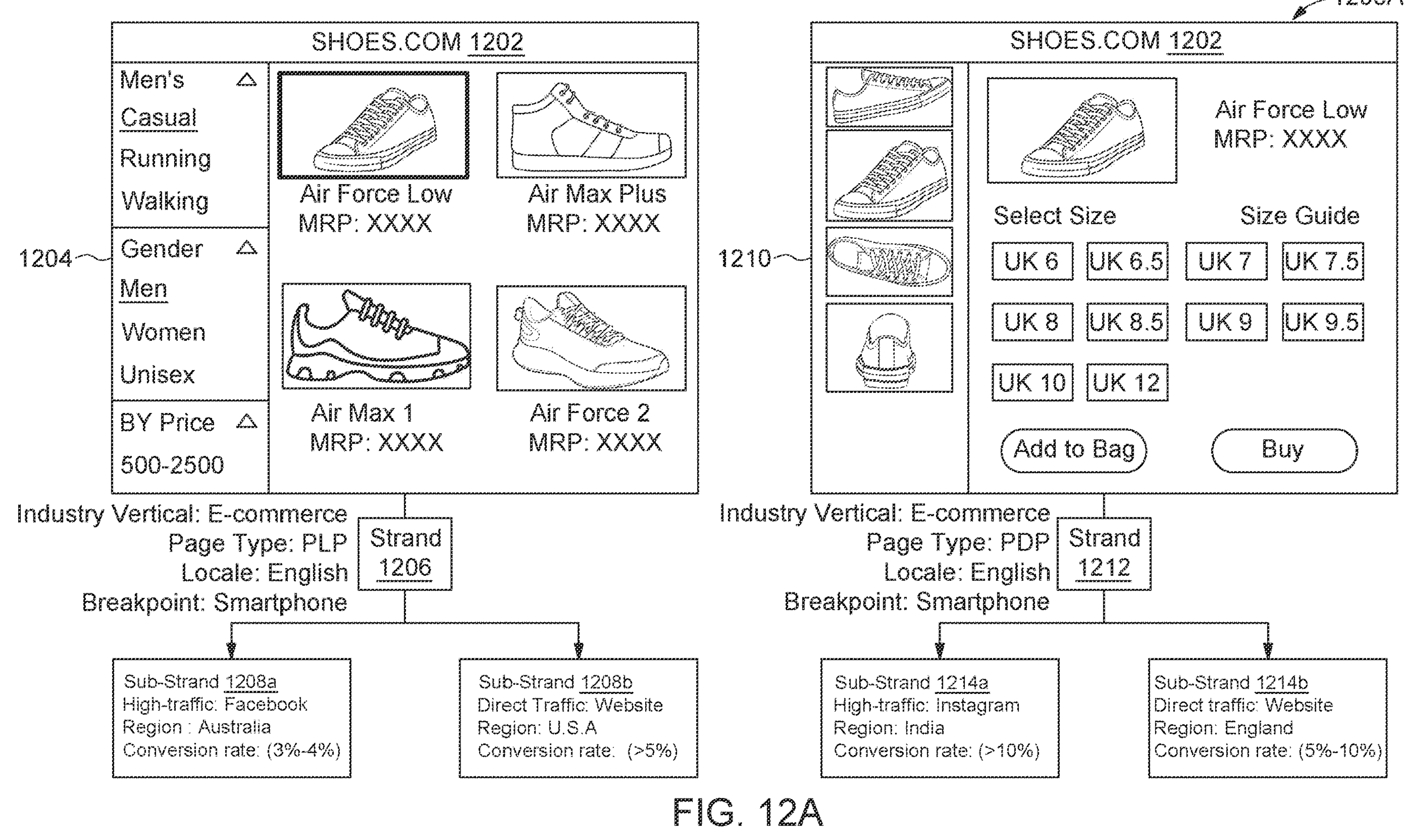
FIGS. 12A-12B depict exemplary scenarios for categorization of pages into strands and subsequent classification into sub-strands, in accordance with an exemplary embodiment of the present disclosure.
Figure 12B:
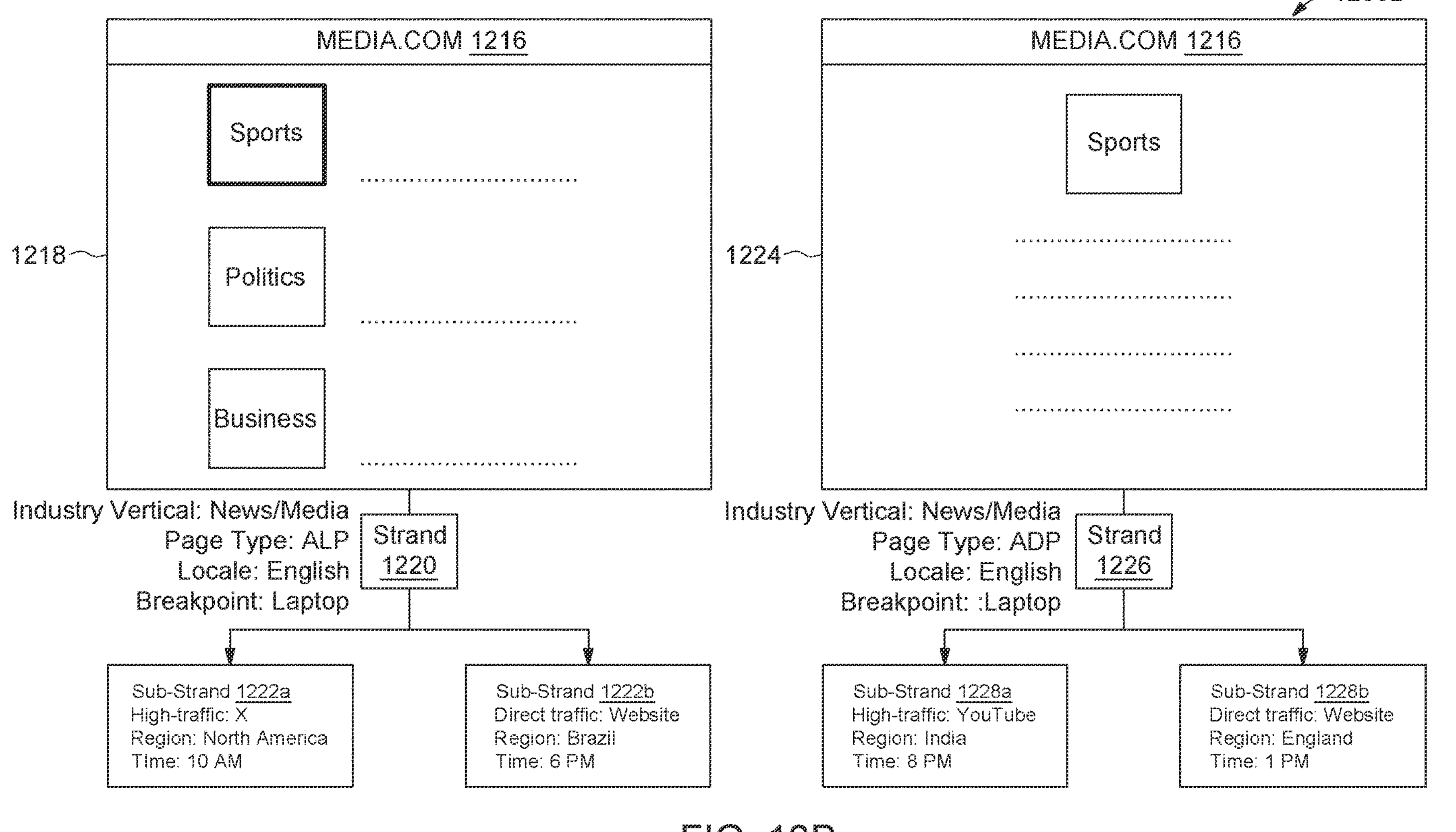

FIGS. 12A and 12B depict exemplary scenarios for categorization of pages into strands and subsequent classification into sub-strands, in accordance with an exemplary embodiment of the present disclosure. The embodiment is explained in conjunction with the description provided in FIG. 1-FIG. 11.

FIG. 12A depicts an exemplary scenario 1200A where pages of an e-commerce website 1202 (i.e., SHOES.COM) are processed for categorization into strands and subsequent classification into sub-strands. For instance, as shown in FIG. 12A, a page 1204 may display various shoes that are available on SHOES.COM. In other words, the page 1204 is a product listing page (PLP) from the industry vertical of e-commerce. A first ML model (for example, the first ML model 108) may analyze the page 1204 by processing the content of the page 1204, metadata associated with the page 1204, and URL structure of the page 1204. Based on the analysis, the first ML model may determine that the page 1204 is a PLP in the e-commerce industry vertical. The first ML model may further determine that the page 1204 is in English and is configured to be rendered on a smartphone. Thus, the first ML model may categorize the page 1204 into a strand 1206 that is created for the following combination: PLP (page type), e-commerce (vertical), breakpoint (smartphone), and locale (English). It may be apparent that a strand may be created based on a single attribute, i.e., one of page type, breakpoint, industry vertical, and locale. The above combination has been taken for ease of explanation. In a similar manner, the first ML model may categorize a second page (not shown in FIG. 12A) from another e-commerce website (for example, electronics.com) into the strand 1206. The second page is also a PLP from the e-commerce industry vertical, is in English and is structured to be rendered on smartphones.

Subsequently, based on an associated set of second parameters, such as, traffic sources (e.g., direct, search, affiliate link, social network), traffic volume patterns (e.g., traffic time information, traffic geographical information, traffic demographical information, and concentration information), inventory availability, frequency of changes related to availability, and frequency of price changes, a second ML model (for example, the second ML model 110) may classify the page 1204 into a sub-strand 1208*a* and the second page into a sub-strand 1208*b*. Both the sub-strands 1208*a* and 1208*b* may have the same parameters but with a different range of values. These parameters may include information regarding traffic sources (i.e., via a social networks, a search engine, or direct traffic), regions from where a given page has been viewed the most, and the conversion rate. In this scenario, values of these parameters for the sub-strand 1208*a* may be as follows: Traffic Source: FACEBOOK®, Region: Australia, and Conversion Rate: between 3%-4%. In a similar manner, values of these parameters for the sub-strand 1208*b* may be as follows: Traffic Source: Direct (website), Region: USA, and Conversion Rate: greater than 5%. The set of second parameters for the page 1204 may align with attributes and value ranges of the sub-strand 1208*a*. As a result, the page 1204 is classified into the sub-strand 1208*a*. While the set of second parameters for the second page may align with attributes and value ranges of the sub-strand 1208*b*. As a result, the second page is classified into the sub-strand 1208*b*.

It should be noted that the page classification process is not limited solely to PLPs. In addition to PLPs, classification may also be applied to other pages within the same industry vertical. For example, consider another scenario where the user may be accessing a page 1210 that may show details of specific shoes. This page 1210 may be called a Product Details Page (PDP) and may display different sizes of the selected shoes. The page 1210 may also provide an option to purchase the shoes. The first ML model may analyze this page 1210 based on content, metadata, URL, and structure. Accordingly, the first ML model may categorize the page 1210 into a strand 1212 that is created for the following combination: PDP (page type), e-commerce (vertical), breakpoint (smartphone), and locale (English). In a similar manner, the first ML model may categorize a fourth page (not shown in FIG. 12A) from another e-commerce website (for example, electronics.com) into the strand 1212. The second page is also a PDP from the e-commerce industry vertical, is in English, and is structured to be rendered on smartphones.

The second ML model may then analyze the set of second parameters associated with the page 1210 and the fourth page to classify these pages into a sub-strand 1214*a* or a sub-strand 1214*b*. Both the sub-strands 1214*a* and 1214*b* may have same parameters but with different range of values. These parameters may include information regarding traffic sources (i.e., via a social networks, a search engine, or direct traffic), regions from where a given page has been viewed the most, and the conversion rate. In this scenario, values of these parameters for the sub-strand 1214*a* may be as follows: Traffic Source: INSTAGRAM®, Region: India, and Conversion Rate: greater than 10%. In a similar manner, values of these parameters for the sub-strand 1214*b* may be as follows: Traffic Source: Direct (website), Region: England, and Conversion Rate: between 5%-10%. The set of second parameters for the page 1210 may align with attributes and value ranges of the sub-strand 1214*a*. As a result, the page 1210 is classified into the sub-strand 1214*a*. While the set of second parameters for the fourth page may align with attributes and value ranges of the sub-strand 1214*b*. As a result, the fourth page is classified into the sub-strand 1214*b*.

FIG. 12B depicts an exemplary scenario 1200B where pages of a Media website (i.e., MEDIA.COM 1216) are processed for categorization into strands and subsequent classification into sub-strands. For instance, as shown in FIG. 12B, a page 1218 may display various articles or videos on the topics of sports, politics, and business that are available on MEDIA.COM. In other words, the page 1218 is from the industry vertical of news and media and is an Article Listing Page (ALP). The first ML model may analyze the page 1218 by processing a content of the page 1218, metadata associated with that page, and URL structure of that page. Based on the analysis, the first ML model may determine that the page 1218 is an ALP in the news and media industry vertical. The first ML model may further determine that the page 1218 is in English and is configured to be rendered on a laptop. Thus, the first ML model may categorize the page 1218 into a strand 1220 that is created for the following combination: ALP (page type), news and media (vertical), breakpoint (laptop), and locale (English). In a similar manner, the first ML model may categorize a sixth page (not shown in FIG. 12A) from another e-commerce website (for example, electronics.com) into the strand 1206. The sixth page is also an ALP from the news and media industry vertical, is in English and is structured to be rendered on laptops.

The second ML model may then analyze the set of second parameters associated with the page 1218 and the sixth page to classify these pages into a sub-strand 1222*a* and a sub-strand 1222*b*. Both the sub-strands 1222*a* and 1222*b* may have the same parameters but with a different range of values. These parameters may include information regarding traffic sources (i.e., via a social networks, a search engine, or direct traffic), regions from where a given page has been viewed the most, and time of the day that has highest number of views. In this scenario, values of these parameters for the sub-strand 1222*a* may be as follows: Traffic Source: X®, Region: North America, and Time with highest views: 10 AM. In a similar manner, values of these parameters for the sub-strand 1222*b* may be as follows: Traffic Source: Direct (website), Region: Brazil, and Time with highest views: 6 PM. The set of second parameters for page 1218 may align with attributes and value ranges of the sub-strand 1222*a*. As a result, the page 1218 is classified into the sub-strand 1222*a*. While the set of second parameters for the sixth page may align with attributes and value ranges of the sub-strand 1222*b*. As a result, the sixth page is classified into the sub-strand 1222*b*.

In a similar manner a page 1224 and an eighth page may be categorized by the first ML model into a strand 1226 that is created for the following combination: Article Display Page (ADP) (page type), news and media (vertical), breakpoint (laptop), and locale (English). The second ML may classify the page 1224 into a sub-strand 1228*a*, while the eighth page into the sub-strand 1228*b*.

After classification of pages 1204, 1210, 1218, and 1224 into respective sub-strands, scores may be determined for each of these pages. Based on the determined scores, actions may be performed on each of these pages. These actions may be rendering the page in a certain way or deciding a placement of the page in search results. The score, which may be representative of a risk associated with the page, may guide this deployment decision. A risk-based decision-making process may ensure appropriate deployment strategies for each page, enhancing overall operational efficiency and adaptability.

For ease of explanations, let us take example of the page 1204 which has been classified into the sub-strand 1208*a* with parameters and respective values as follows: Traffic Source: FACEBOOK®, Region: Australia, and Conversion Rate: between 3%-4%. Further, by virtue of the parameters having weights assigned to them for a given page, the set of second parameters associated with the sub-strand 1208 may also derive the same weights. In this case, for example, the parameter "conversion rate" may be given the highest weight of "0.5," the parameter "region" may be given the weight of "0.3," and the parameter "traffic source" may be given the weight of "0.2." The score may be a weighted function of the weights and values of the corresponding parameters. This score may be indicative of the priority or risk associated with the page 1204. The score may then be used to arrive at a deployment decision to be taken for the page 1204.

Figure 13:
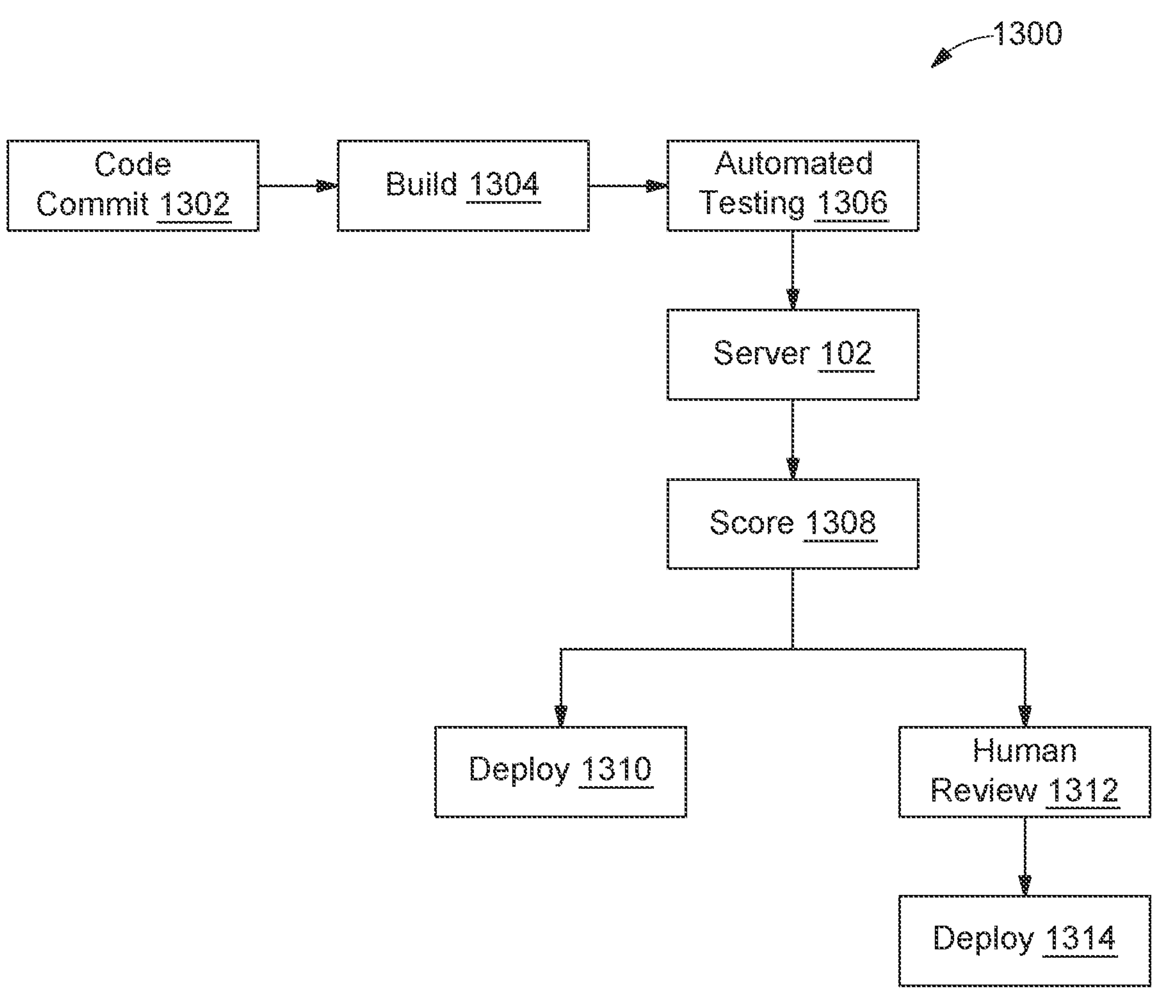
FIG. 13 illustrates a deployment environment in which a deployment decision is performed for a website based on a score determined for various pages of the website, in accordance with an exemplary embodiment of the present disclosure.

FIG. 13 illustrates a deployment environment 1300 in which a deployment decision is performed for a website based on a score determined for various pages of the website, in accordance with an exemplary embodiment of the present disclosure. The deployment environment 1300 may be associated with DevOps in some implementations. By way of an example, the deployment environment 1300 may be an AWS® web server. The server 102 may also be a part of the deployment environment 1300.

At a code commit stage 1302, the website that is to be deployed and the associated deployment codes are stored. At a build stage 1304, source code associated with the website is compiled, tests are executed, and software packages that are ready to be deployed are produced. Thereafter, at automated testing stage 1306, testing is performed on the software packages. Before deployment of the website, the server 102 processes each page of the website to determine a score 1308 (which may be a risk score) for each page. The determination of score by the server 102 has already been explained in detail in conjunction with FIGS. 1-12.

Based on the determined score 1308, if the score 1308 for a page is below a predefined risk threshold, the page is deployed at 1310. However, if the score 1308 for a page is equal to or greater than the predefined risk threshold, the page undergoes a human review stage 1312. Once the human review is completed, the page is deployed at 1314. In another implementation, after going through the human review stage 1312, the page may be reprocessed by the server 102 to determine a revised score for further deployment or human review. It will be apparent to a person skilled in the art that multiple variations of deployment decisions in different deployment environments is within the scope of the invention and the invention is not limited to the scenario depicted above.

As will be also appreciated, the above-described techniques may take the form of computer or controller implemented processes and apparatuses for practicing those processes. The disclosure can also be embodied in the form of computer program code containing instructions embodied in tangible media, such as floppy diskettes, solid state drives, CD-ROMs, hard drives, or any other computer-readable storage medium, wherein, when the computer program code is loaded into and executed by a computer or controller, the computer becomes an apparatus for practicing the invention. The disclosure may also be embodied in the form of computer program code or signal, for example, whether stored in a storage medium, loaded into and/or executed by a computer or controller, or transmitted over some transmission medium, such as over electrical wiring or cabling, through fiber optics, or via electromagnetic radiation, wherein, when the computer program code is loaded into and executed by a computer, the computer becomes an apparatus for practicing the invention. When implemented on a general-purpose microprocessor, the computer program code segments configure the microprocessor to create specific logic circuits.

Figure 14:
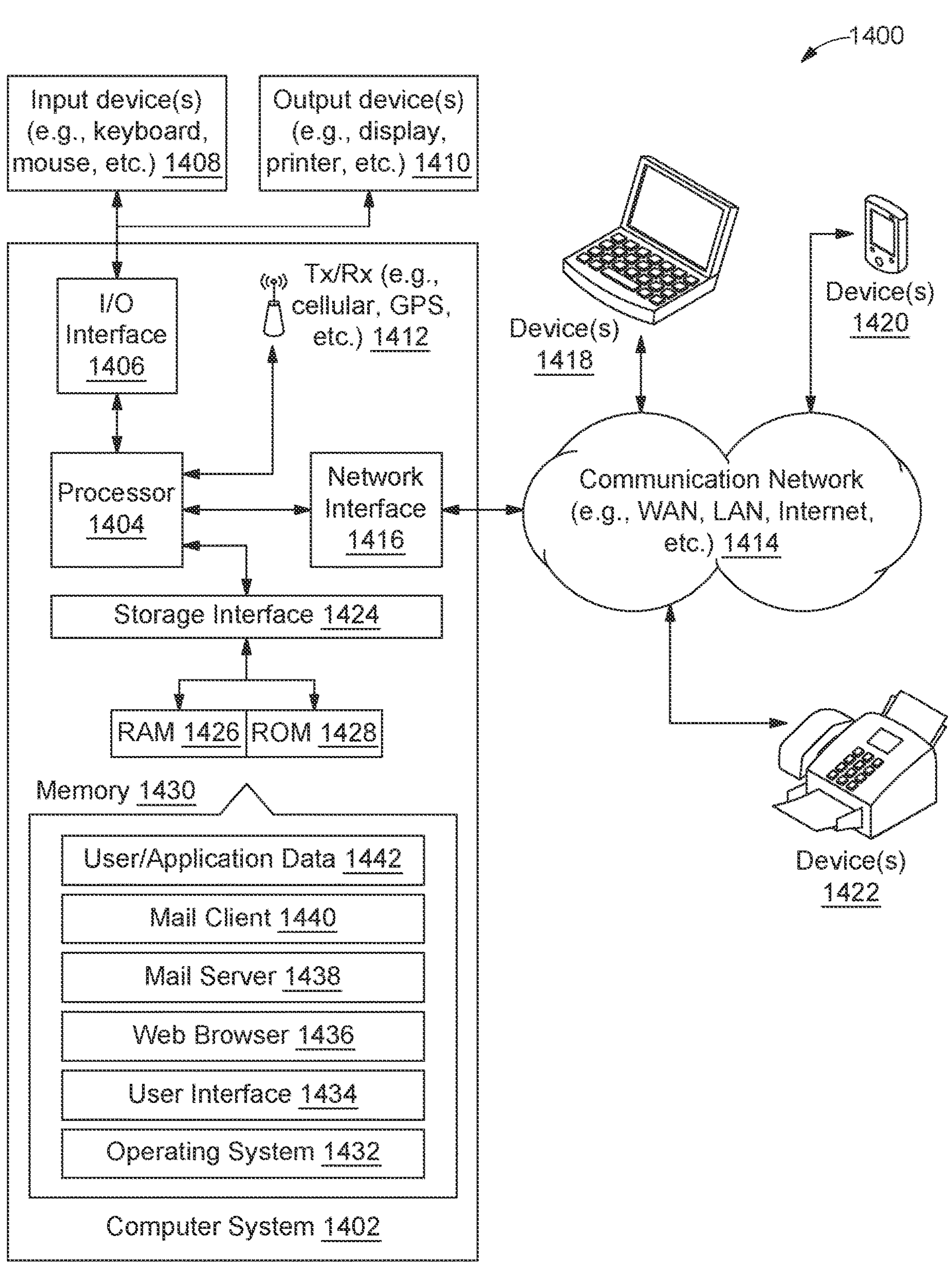
FIG. 14 is a block diagram that illustrates a system architecture of a computer system for page management, in accordance with an exemplary embodiment of the present disclosure.

The disclosed methods and systems may be implemented on a conventional or a general-purpose computer system, such as a personal computer (PC) or server computer. FIG. 14 is a block diagram that illustrates a system architecture 1400 of a computer system 1402 for page management, in accordance with an exemplary embodiment of the present disclosure. Variations of computer system 1402 may be used for implementing server 101 for personalization of user experience. Computer system 1402 may include a central processing unit ("CPU" or "processor") 1404. Processor 1404 may include at least one data processor for executing program components for executing user-generated or system-generated requests. A user may include a person, a person using a device such as such as those included in this disclosure, or such a device itself. The processor may include specialized processing units such as integrated system (bus) controllers, memory management control units, floating point units, Graphics Processing Units (GPUs), digital signal processing units, etc. The processor may include a microprocessor, such as AMD® ATHLON®, DURON® OR OPTERON®, ARM's application, embedded or secure processors, IBM® POWERPC®, INTEL® CORE® processor, ITANIUM® processor, XEON® processor, CELERON® processor or other line of processors, etc. Examples of GPUs may include, but are not limited to NVIDIA® QUADRO®, NVIDIA® RTX®, AMD® FIREPRO®, AMD® RADEON PRO®, INTEL® ARC®, INTEL® ARC PRO®, GEFORCE® GTX®, RTX®, NVIDIA® TITAN®, RADEON HD®, or RADEON VII®. The processor 1404 may be implemented using mainframe, distributed processor, multi-core, parallel, grid, or other architectures. Some embodiments may utilize embedded technologies like application-specific integrated circuits (ASICs), digital signal processors (DSPs), Field Programmable Gate Arrays (FPGAs), etc.

Processor 1404 may be disposed in communication with one or more input/output (I/O) devices via I/O interface 1406. The I/O interface 1406 may employ communication protocols/methods such as, without limitation, audio, analog, digital, monoaural, RCA, stereo, IEEE-1394, near field communication (NFC), Fire Wire, Camera Link®, GigE, serial bus, universal serial bus (USB), infrared, PS/2, BNC, coaxial, component, composite, digital visual interface (DVI), high-definition multimedia interface (HDMI), radio frequency (RF) antennas, S-Video, video graphics array (VGA), IEEE 802.n/b/g/n/x, Bluetooth, cellular (e.g., code-division multiple access (CDMA), high-speed packet access (HSPA+), global system for mobile communications (GSM), long-term evolution (LTE), WiMAX, or the like), etc.

Using the I/O interface 1406, the computer system 1402 may communicate with one or more I/O devices. For example, the input device 1408 may be an antenna, keyboard, mouse, joystick, (infrared) remote control, camera, card reader, fax machine, dongle, biometric reader, microphone, touch screen, touchpad, trackball, sensor (e.g., accelerometer, light sensor, GPS, altimeter, gyroscope, proximity sensor, or the like), stylus, scanner, storage device, transceiver, video device/source, visors, etc. Output device 1410 may be a printer, fax machine, video display (e.g., cathode ray tube (CRT), liquid crystal display (LCD), light-emitting diode (LED), plasma, or the like), audio speaker, etc. In some embodiments, a transceiver 1412 may be disposed in connection with the processor 1404. The transceiver 1412 may facilitate various types of wireless transmission or reception. For example, the transceiver 1412 may include an antenna operatively connected to a transceiver chip (e.g., TEXAS INSTRUMENTS® WILINK WL1286®, BROADCOM® BCM4550IUB8®, INFINEON TECHNOLOGIES® X-GOLD 1436-PMB9800® transceiver, or the like), providing IEEE 802.11a/b/g/n, Bluetooth, FM, global positioning system (GPS), 2G/3G HSDPA/HSUPA communications, etc.

In some embodiments, the processor 1404 may be disposed in communication with a communication network 1414 via a network interface 1416. The network interface 1416 may communicate with the communication network 1414. The network interface 1416 may employ connection protocols including, without limitation, direct connect, Ethernet (e.g., twisted pair 10/100/1000 Base T), transmission control protocol/internet protocol (TCP/IP), token ring, IEEE 802.11a/b/g/n/x, etc. The communication network 1414 may include, without limitation, a direct interconnection, local area network (LAN), wide area network (WAN), wireless network (e.g., using Wireless Application Protocol), the Internet, etc. Using the network interface 1416 and the communication network 1414, the computer system 1402 may communicate with devices 1410, 1418, 1420, and 1422. These devices may include, without limitation, personal computer(s), server(s), fax machines, printers, scanners, various mobile devices such as cellular telephones, smartphones (e.g., APPLE® IPHONE®, BLACKBERRY® smartphone, ANDROID® based phones, etc.), tablet computers, eBook readers (AMAZON® KINDLE®, NOOK® etc.), laptop computers, notebooks, gaming consoles (MICROSOFT® XBOX®, NINTENDO® DS®, SONY®

PLAYSTATION®, etc.), or the like. In some embodiments, the computer system 1402 may itself embody one or more of these devices.

In some embodiments, the processor 1404 may be disposed in communication with one or more memory devices 1 (e.g., RAM 1426, ROM 1428, etc.) via a storage interface 1424. The storage interface 1424 may connect to memory devices including, without limitation, memory drives, removable disc drives, etc., employing connection protocols such as serial advanced technology attachment (SATA), integrated drive electronics (IDE), IEEE-1394, universal serial bus (USB), fiber channel, small computer systems interface (SCSI), STD Bus, RS-232, RS-422, RS-485, I2C, SPI, Microwire, 1-Wire, IEEE 1284, Intel® QuickPathInterconnect, InfiniBand, PCIe, etc. The memory drives may further include a drum, magnetic disc drive, magneto-optical drive, optical drive, redundant array of independent discs (RAID), solid-state memory devices, solid-state drives, etc.

The memory devices may store a collection of program or database components, including, without limitation, an operating system 1430, user interface 1432, web browser 1434, mail server 1436, mail client 1438, user/application data 1440 (e.g., any data variables or data records discussed in this disclosure), etc. The operating system 1430 may facilitate resource management and operation of the computer system 1402. Examples of operating systems include, without limitation, APPLE® MACINTOSH® OS X, UNIX, Unix-like system distributions (e.g., Berkeley Software Distribution (BSD), FreeBSD, NetBSD, OpenBSD, etc.), Linux distributions (e.g., RED HAT®, UBUNTU®, KUBUNTU®, etc.), IBM® OS/2, MICROSOFT® WINDOWS® (XP®, Vista®/7/8/10/11, etc.), APPLE® IOS®, GOOGLE® ANDROID®, BLACKBERRY® OS, or the like. User interface 1432 may facilitate display, execution, interaction, manipulation, or operation of program components through textual or graphical facilities. For example, user interfaces may provide computer interaction interface elements on a display system operatively connected to the computer system 1402, such as cursors, icons, check boxes, menus, scrollers, windows, widgets, etc. Graphical user interfaces (GUIs) may be employed, including, without limitation, APPLE® MACINTOSH® operating systems' AQUA® platform, IBM® OS/2®, MICROSOFT® WINDOWS® (e.g., AERO®, METRO®, etc.), UNIX X-WINDOWS, web interface libraries (e.g., ACTIVEX®, JAVA®, JAVASCRIPT®, AJAX®, HTML, ADOBE® FLASH®, etc.), or the like.

In some embodiments, the computer system 1402 may implement a web browser 1434 stored program component. The web browser 1434 may be a hypertext viewing application, such as MICROSOFT® INTERNET EXPLORER®, GOOGLE® CHROME®, MOZILLA® FIREFOX®, APPLE® SAFARI®, etc. Secure web browsing may be provided using HTTPS (secure hypertext transport protocol), secure sockets layer (SSL), Transport Layer Security (TLS), etc. Web browsers may utilize facilities such as AJAX®, DHTML, ADOBE® FLASH®, JAVASCRIPT®, JAVA®, application programming interfaces (APIs), etc. In some embodiments, the computer system 1402 may implement a mail server 1436 stored program component. The mail server 1436 may be an Internet mail server such as MICROSOFT® EXCHANGE®, or the like. The mail server 1436 may utilize facilities such as ASP, ActiveX, ANSI C++/C#, MICROSOFT.NET® CGI scripts, JAVA®, JAVASCRIPT® PERL®, PHP®, PYTHON®, WebObjects, etc. The mail server 1436 may utilize communication protocols such as internet message access protocol (IMAP), messaging application programming interface (MAPI), MICROSOFT® EXCHANGE®, post office protocol (POP), simple mail transfer protocol (SMTP), or the like. In some embodiments, the computer system 1402 may implement a mail client 1436 stored program component. The mail client 1436 may be a mail viewing application, such as APPLE MAIL®, MICROSOFT ENTOURAGE®, MICROSOFT OUTLOOK®, MOZILLA THUNDERBIRD®, etc.

In some embodiments, computer system 1402 may store user/application data 1438, such as the data, variables, records, etc. (e.g., the set of predictive models, the plurality of clusters, set of parameters (batch size, number of epochs, learning rate, momentum, etc.), accuracy scores, competitiveness scores, ranks, associated categories, rewards, threshold scores, threshold time, and so forth) as described in this disclosure. Such databases may be implemented as fault-tolerant, relational, scalable, secure databases such as ORACLE® OR SYBASE® OR POSTGRESQL® OR any such similar data. Alternatively, such databases may be implemented using standardized data structures, such as an array, hash, linked list, struct, structured text file (e.g., XML), table, or as object-oriented databases (e.g., using OBJECTSTORE®, POET®, ZOPE®, etc.). Such databases may be consolidated or distributed, sometimes among the various computer systems discussed above in this disclosure. It is to be understood that the structure and operation of the any computer or database component may be combined, consolidated, or distributed in any working combination.

As will be appreciated by those skilled in the art, the techniques described in the various embodiments discussed above are not routine, or conventional, or well understood in the art. The techniques discussed above provide for page management. The techniques provide an efficient way to manage a large number of web pages, especially for large-scale dynamic websites. It automates the process of categorizing and classifying web pages, which may be impractical to do manually. The techniques allow for real-time computations and adaptability. It may respond to changes in real-time, making it highly suitable for dynamic websites where content and user behavior may change frequently. The techniques incorporate a risk-based decision-making process. This ensures appropriate deployment strategies for each page, enhancing overall operational efficiency. By understanding the characteristics of each page and how users interact with them, the techniques may help to improve the user experience. For example, it may help to ensure that users are directed to the most relevant pages based on their behavior and preferences. The techniques use a data-driven approach, considering various set of parameters such as traffic sources, traffic volume patterns, inventory availability, frequency of changes, etc., for more accurate and effective page management. The techniques employ ML models to categorize and classify web pages.

The techniques may be scalable and may manage a large number of web pages. This makes it suitable for large-scale websites with thousands or even millions of pages. Additionally, the techniques discussed above may be used for managing webpages in any of the retail sector, E-commerce sector, online advertising sector, social media sector, telecommunications sector, insurance sector, automotive industry, financial services, travel sector, transportation sector, logistics sector, real estate sector, public and social sector, sports sector, energy sector, mining sector, healthcare sector, education sector, or consumer packaged goods sector. Moreover, the techniques discussed above may be implemented on one of a consumer website, an enterprise website, a consumer web application, an enterprise web application, or an instore display application.

In light of the above-mentioned advantages and the technical advancements provided by the disclosed method and system, the claimed steps as discussed above are not routine, conventional, or well understood in the art, as the claimed steps enable the following solutions to the existing problems in conventional technologies. Further, the claimed steps clearly bring an improvement in the functioning of the device itself as the claimed steps provide a technical solution to a technical problem.

The specification has described method and system for page management. The illustrated steps are set out to explain the exemplary embodiments shown, and it should be anticipated that ongoing technological development will change the manner in which particular functions are performed. These examples are presented herein for purposes of illustration, and not limitation. Further, the boundaries of the functional building blocks have been arbitrarily defined herein for the convenience of the description. Alternative boundaries can be defined so long as the specified functions and relationships thereof are appropriately performed. Alternatives (including equivalents, extensions, variations, deviations, etc., of those described herein) will be apparent to persons skilled in the relevant art(s) based on the teachings contained herein. Such alternatives fall within the scope and spirit of the disclosed embodiments.

Furthermore, one or more computer-readable storage media may be utilized in implementing embodiments consistent with the present disclosure. A computer-readable storage medium refers to any type of physical memory on which information or data readable by a processor may be stored. Thus, a computer-readable storage medium may store instructions for execution by one or more processors, including instructions for causing the processor(s) to perform steps or stages consistent with the embodiments described herein. The term "computer-readable medium" should be understood to include tangible items and exclude carrier waves and transient signals, i.e., be non-transitory. Examples include random access memory (RAM), read-only memory (ROM), volatile memory, nonvolatile memory, hard drives, CD ROMs, DVDs, flash drives, disks, and any other known physical storage media.

It is intended that the disclosure and examples be considered as exemplary only, with a true scope and spirit of disclosed embodiments being indicated by the following claims.

What is claimed is:

1. A computer-implemented method of page management, comprising:
- selecting, by a server, a training dataset comprising a plurality of pages pre-categorized into a plurality of strands;
- training, by the server, based on the selected training dataset, a first machine learning (ML) model to categorize the plurality of pages into the plurality of strands, each of the plurality of strands being based on a combination of one or more of industry vertical, locale, breakpoint, or page type, wherein the training dataset comprises the plurality of pages and an associated set of first parameters for each of the plurality of pages, and wherein the associated set of first parameters corresponds to at least two of a group comprising: a type of content on the page, a structure of a uniform resource locator (URL) of the page, and metadata of the page;
- inputting, by the server, the training dataset to the first ML model for categorization, wherein the first ML model categorizes each of the plurality of pages into at least one of the plurality of strands;
- comparing, by the server, a result of the categorization of the plurality of pages by the first ML model with the pre-categorization associated with the plurality of pages;
- determining, by the server, a degree of accuracy of the first ML model based on the comparison;
- performing, by the server, reinforcement learning of the first ML model until the degree of accuracy of the first ML model is above a predetermined threshold;
- categorizing, by the server, using the trained first ML model, a set of pages into at least one of the plurality of strands, based on the set of first parameters associated with each of the set of pages;
- determining, by the server, using a second ML model, a count of sub-strands to be created for classification of the set of pages, wherein the count of sub-strands is determined by the second ML model based on a set of second parameters and a value of each of the set of second parameters for each page of the set of pages, and wherein each sub-strand is linked to a strand of the plurality of strands;
- creating, by the server, a plurality of sub-strands corresponding to the determined count of sub-strands;
- classifying, by the server, using the second ML model, each of the set of pages into one of the plurality of sub-strands, based on the associated set of second parameters and the linked strand from the plurality of strands, wherein each of the plurality of sub-strands is linked with a subset of the set of second parameters, wherein each of the plurality of sub-strands is representative of a unique combination of a range of values of a corresponding subset of the set of second parameters along with associated weights, and wherein each of the subset of second parameters has a weight of the associated weights that is unique for that sub-strand;
- determining, by the server, for each of the set of pages, a score based on the associated sub-strand, the weight for each of the subset of second parameters of the associated sub-strand, and the value of each of the subset of second parameters of the associated sub-strand, wherein the score determined for each of the set of pages is indicative of a level of risk associated with the corresponding page;
- applying, by the server, a deployment decision for deployment of a page of the set of pages, wherein the application of the deployment decision is based on the score determined for the corresponding page; and
- deploying, by the server, the page based on the applied deployment decision.

2. The computer-implemented method of claim 1, further comprising pre-processing, by the server, each of the set of pages, wherein the pre-processing of each page comprises:
- extracting, by the server, a set of data vectors from at least one source associated with the page;
- removing, by the server, a subset of data vectors that correspond to noise; and
- normalizing, by the server, the remaining set of data vectors to generate a normalized set of data vectors.

3. The computer-implemented method of claim 2, further comprising:

processing, by the server, using the trained first ML model, the normalized set of data vectors based on attributes associated with each of the plurality of strands; and categorizing, by the server, using the trained first ML model, the page under the strand in response to the processing, wherein the categorization of the page into a strand of the plurality of strands is based on the classification of the page.

4. The computer-implemented method of claim 1, further comprising:

identifying, by the server, a trigger event; and initiating, by the server, the categorization of the set of pages based on the identification of the trigger event.

5. The computer-implemented method of claim 1, further comprising determining, by the server, using the second ML model, a unique set of attributes for each of the plurality of sub-strands.

6. The computer-implemented method of claim 5, further comprising:

identifying, by the server, introduction of a new page, wherein the new page is absent in the set of pages;

determining, by the server, the set of first parameters and the set of second parameters associated with the new page;

categorizing, by the server, using the first ML model, the new page into at least one of the plurality of strands, based on the set of first parameters of the new page;

matching, by the server, using the second ML model, the set of second parameters of the new page with the unique set of attributes determined for each of the plurality of sub-strands; and classifying, by the server, the new page into a sub-strand from the plurality of sub-strands, wherein a cosine distance between the set of second parameters of the new page and the unique set of attributes of the sub-strand is the least.

7. The computer-implemented method of claim 1, further comprising:

identifying, by the server, a trigger event associated with a page from the set of pages;

reclassifying, by the server, the page into a sub-strand from the plurality of sub-strands in response to the trigger event; and recomputing, by the server, the score for the page, based on the associated sub-strand, weight for each of the subset of second parameters of the associated sub-strand, and values of each of the subset of second parameters of the associated sub-strand.

8. The computer-implemented method of claim 7, wherein the trigger event comprises change in value of at least one of the set of second parameters associated with the page.

9. The computer-implemented method of claim 1, further comprising training the second ML model, wherein the training comprises:

selecting, by the server, a training dataset of pages pre-classified into a first predefined number of a first set of sub-strands, wherein a degree of variance amongst values of the set of second parameters for the training dataset of pages is above a threshold;

inputting, by the server, via the second ML model, the training dataset of pages;

determining, by the server, using the second ML model, a second predefined number of a second set of sub-strands to be created based on values of the set of second parameters associated with each of the training dataset of pages;

classifying, by the server, using the second ML model, each of the training dataset of pages into one of the second set of sub-strands; and comparing, by the server, each of:

the second predefined number with the first predefined number; and a set of attributes for each of the first set of sub-strands with attributes of corresponding sub-strands from the second set of sub-strands;

determining, by the server, a degree of accuracy of the second ML model based on the comparison; and performing, by the server, reinforcement learning of the second ML model until the degree of accuracy of the second ML model is above a predetermined threshold.

10. The computer-implemented method of claim 1, further comprising determining, by the server, compliance of the value of each of the subset of second parameters with a corresponding predefined threshold range defined for the sub-strand for the classification of each of the set of pages.

11. A system for page management, comprising:

a processor; and a memory communicatively coupled to the processor, wherein the memory stores processor instructions, which when executed by the processor, cause the processor to:

select a training dataset comprising a plurality of pages pre-categorized into a plurality of strands;

train based on the selected training dataset, a first machine learning (ML) model to categorize pages into the plurality of strands, each of the plurality of strands being based on a combination of one or more of industry vertical, locale, breakpoint, or page type, wherein the training dataset comprises the plurality of pages and an associated set of first parameters for each of the plurality of pages, and wherein the associated set of first parameters corresponds to at least two of a group comprising: a type of content on the page, a structure of a uniform resource locator (URL) of the page, and metadata of the page;

input the training dataset to the first ML model for categorization, wherein the first ML model categorizes each of the plurality of pages into at least one of the plurality of strands;

compare a result of the categorization of the plurality of pages by the first ML model with the pre-categorization associated with the plurality of pages;

determine a degree of accuracy of the first ML model based on the comparison;

perform reinforcement learning on the first ML model until the degree of accuracy of the first ML model is above a predetermined threshold;

categorize, using the first ML model, a set of pages into at least one of the plurality of strands, based on the set of first parameters associated with each of the set of pages;

determine, using a second ML model, a count of sub-strands to be created for classification of the set of pages, wherein the count of sub-strands is determined by the second ML model based on a set of second parameters and a value of each of the set of second parameters for each page of the set of pages, and wherein each sub-strand is linked to a strand of the plurality of strands;

create a plurality of sub-strands corresponding to the determined count of sub-strands;

classify each of the set of pages, using the second ML model, into one of the plurality of sub-strands, based on the associated set of second parameters and the linked strand from the plurality of strands, wherein each of the plurality of sub-strands is linked with a subset of the set of second parameters, wherein each of the plurality of sub-strands is representative of a unique combination of a range of values of a corresponding subset of the set of second parameters along with associated weights, and wherein each of the subset of second parameters has a weight of the associated weights that is unique for that sub-strand;

determine, for each of the set of pages, a score, based on the associated sub-strand, the weight for each of the subset of second parameters of the associated sub-strand, and the value of each of the subset of second parameters of the associated sub-strand, wherein the score determined for each of the set of pages is indicative of a level of risk associated with the corresponding page;

apply a deployment decision for deployment of a page of the set of pages, wherein the application of the deployment decision is based on the score determined for the corresponding page; and deploy the page based on the applied deployment decision.

12. The system of claim 11, wherein the processor instructions, on execution, further cause the processor to pre-process each of the set of pages, and wherein to pre-process each of the set of pages, the processor is configured to:

extract a set of data vectors from at least one source associated with the page;

remove a subset of data vectors that correspond to noise; and normalize the remaining set of data vectors to generate a normalized set of data vectors.

13. The system of claim 12, wherein the processor instructions, on execution, further cause the processor to:

process, using the trained first ML model, the normalized set of data vectors based on attributes associated with each of the plurality of strands; and categorize, using the trained first ML model, the page under the strand in response to the processing, wherein the categorization of the page into a strand of the plurality of strands is based on the classification of the page.

14. The system of claim 11, wherein the processor instructions, on execution, further cause the processor to:

identify a trigger event; and initiate the categorization of the set of pages based on the identification of the trigger event.

15. The system of claim 11, wherein the processor instructions, on execution, further cause the processor to:

identify a trigger event associated with a page from the set of pages;

reclassify the page into a sub-strand from the plurality of sub-strands in response to the trigger event; and recompute the score for the page, based on the associated sub-strand, weight for each of the subset of second parameters of the associated sub-strand, and values of each of the subset of second parameters of the associated sub-strand, wherein the trigger event comprises change in value of at least one of the set of second parameters associated with the page.

* * * * *